US010262551B2

(12) United States Patent
DenBoer et al.

(10) Patent No.: US 10,262,551 B2
(45) Date of Patent: Apr. 16, 2019

(54) SYSTEM AND METHOD FOR STRATEGIC MEMORY ASSESSMENT AND REHABILITATION

(71) Applicant: SMART Brain Aging, Inc., Phoenix, AZ (US)

(72) Inventors: John DenBoer, Phoenix, AZ (US); Christopher Peter Ferraro, Ottawa (CA)

(73) Assignee: Smart Brain Aging, Inc., Phoenix, AZ (US)

( * ) Notice: Subject to any disclaimer, the term of this patent is extended or adjusted under 35 U.S.C. 154(b) by 333 days.

(21) Appl. No.: 15/142,963

(22) Filed: Apr. 29, 2016

(65) Prior Publication Data

US 2016/0321945 A1 Nov. 3, 2016

Related U.S. Application Data

(60) Provisional application No. 62/155,668, filed on May 1, 2015.

(51) Int. Cl.
*G09B 19/00* (2006.01)

(52) U.S. Cl.
CPC .................. *G09B 19/00* (2013.01)

(58) Field of Classification Search
CPC ....................................................... G09B 19/00
See application file for complete search history.

(56) References Cited

U.S. PATENT DOCUMENTS

| 6,485,417 | B1* | 11/2002 | Bowles | A61B 5/1101 600/300 |
| 6,517,480 | B1* | 2/2003 | Krass | A61B 5/16 600/300 |
| 9,122,388 | B2* | 9/2015 | Hwang | G06F 3/0488 |
| 9,131,063 | B2* | 9/2015 | Larson | G06F 3/0482 |
| 9,152,212 | B2* | 10/2015 | Gunn | G06F 3/0488 |
| 9,152,306 | B2* | 10/2015 | Anderson | A63F 13/06 |
| 9,158,372 | B2* | 10/2015 | Lombardi | G09G 3/3208 |
| 9,182,903 | B2* | 11/2015 | Lombardi | G06F 1/3206 |
| 9,183,655 | B2* | 11/2015 | Baker | G06F 3/04886 |
| 9,208,692 | B2* | 12/2015 | Considine | G09B 7/02 |
| 9,498,704 | B1* | 11/2016 | Cohen | G09B 5/00 |
| 9,883,831 | B1* | 2/2018 | Stewart | A61B 5/162 |
| 2002/0155419 | A1* | 10/2002 | Banerjee | G09B 7/00 434/322 |
| 2002/0192624 | A1* | 12/2002 | Darby | A61B 5/16 434/236 |

(Continued)

*Primary Examiner* — Jason Skaarup
(74) *Attorney, Agent, or Firm* — Woods Oviatt Gilman LLP; Ronald J. Kisicki, Esq.

(57) ABSTRACT

A systems and method for assessing and enhancing a cognitive ability of a user with early-stage dementia is provided. The method comprises the steps of receiving at least one personalization parameter provided by the user; allowing for the display of at least one cognitive exercise; allowing the user to interact with the at least one cognitive exercise; receiving cognitive data based on the interaction of the at least one cognitive exercise by the user; generating an exercise score based at least in part on the cognitive data; and utilizing the exercise score and the at least one personalization parameter to generate a cognitive ability score, wherein the generated cognitive ability score is utilized in determining a subsequent cognitive exercise to be displayed to the user.

25 Claims, 27 Drawing Sheets

(56) References Cited

U.S. PATENT DOCUMENTS

| | | | | |
|---|---|---|---|---|
| 2003/0167149 A1* | 9/2003 | Simon | ............... | A61B 5/16 |
| | | | | 702/182 |
| 2004/0081945 A1* | 4/2004 | Reeves | ............... | A61B 5/16 |
| | | | | 434/236 |
| 2004/0167380 A1* | 8/2004 | Simon | ............... | A61B 5/16 |
| | | | | 600/300 |
| 2005/0273017 A1* | 12/2005 | Gordon | ............... | A61B 5/048 |
| | | | | 600/544 |
| 2010/0240016 A1* | 9/2010 | Ween | ............... | G16H 15/00 |
| | | | | 434/236 |
| 2011/0236864 A1* | 9/2011 | Ashford | ............... | A61B 5/4088 |
| | | | | 434/236 |
| 2012/0214143 A1* | 8/2012 | Severson | ............... | G16H 50/30 |
| | | | | 434/236 |
| 2012/0238831 A1* | 9/2012 | Benford | ............... | A61B 5/162 |
| | | | | 600/300 |
| 2013/0209977 A1* | 8/2013 | Lathan | ............... | G09B 19/00 |
| | | | | 434/236 |
| 2014/0066802 A1* | 3/2014 | Kaula | ............... | A61B 5/7475 |
| | | | | 600/554 |
| 2014/0142397 A1* | 5/2014 | Bedrosian | ............... | A61B 5/165 |
| | | | | 600/301 |
| 2014/0255900 A1* | 9/2014 | Ferrara | ............... | G09B 5/08 |
| | | | | 434/362 |
| 2014/0316230 A1* | 10/2014 | Denison | ............... | A61B 5/04012 |
| | | | | 600/383 |
| 2014/0330576 A1* | 11/2014 | Bauer | ............... | G06F 19/3418 |
| | | | | 705/2 |
| 2015/0187227 A1* | 7/2015 | Zhang | ............... | G09B 19/00 |
| | | | | 434/236 |

\* cited by examiner

Create profile

Date of Birth
January | 1 | 1950 — 502

Gender
Male — 506

Marital Status
Married — 510

City of Residence
Ottawa, ON, Canada — 514

Highest Education Completed
Master's Degree — 518

Work Status
Actively Working — 522

Occupation
Executive — 526

Interests
My Grandchildren, Music — 530

Motivation for Pursuing SMART Brain U
Current Love One with Dementia — 534

[Save] — 538

SMART Brain U Assessment

Hello Chris!

Welcome to SMART Brain U! We want to learn more about you so that we can tailor a specialized program to your needs. You'll be presented with a series of personality questions that should take about 5 minutes to complete.

Begin

FIG. 6A

What three qualities would you use to describe yourself as a friend? (Choose all that apply)

Loyal
Affectionate
Trust-worthy
Empathetic
Driven
Conscientious
Reserved
Intelligent
Introverted
Extraverted
Creative
Artistic
Goal-Driven
Work-centered Next

FIG. 6C

Copy this drawing as accurately as you can using the grid provided below
(Use your mouse or finger to drag lines to connect points)

Set the clock to 10 past 11
(use your finger or mouse to drag the clock hands)

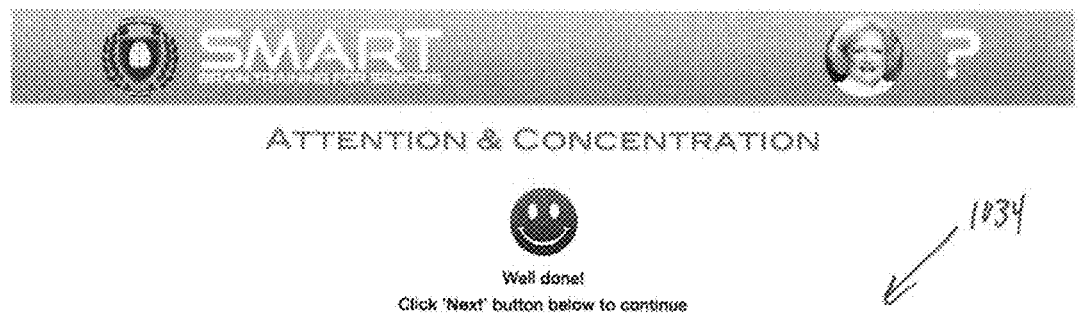
FIG. 10F

SYSTEM AND METHOD FOR STRATEGIC MEMORY ASSESSMENT AND REHABILITATION

CROSS-REFERENCE TO RELATED APPLICATIONS

This application claims the benefit of U.S. Patent Application No. 62/155,668, filed on May 1, 2015, which is hereby incorporated by reference in its entirety.

TECHNICAL FIELD

The present invention is directed to a system and method for strategic memory assessment and rehabilitation; in particular, the present system and method allows for the generation of a cognitive ability score based on one or more personalization parameters provided by a user and cognitive data obtained from the user interacting with one or more cognitive exercises, wherein the cognitive ability score is used to determine subsequent cognitive exercises displayed to a user thereby providing a dynamic process for assessing and enhancing the cognitive ability of a user with early stage dementia.

BACKGROUND OF THE INVENTION

Dementia, including Alzheimer's disease, remains one of the biggest global public health challenges facing our generation. In fact, as the average age of the world population goes up, the incidence and prevalence of this terribly-debilitating disease is rising. Specifically, the population of those with dementia is expected to triple in approximately 10-15 years.

So far, dementia has resisted all attempts to slow down cognitive and functional progressive impairments, and stymied all efforts to help affected people from all walks of life recover from its ravages. In addition to the significant personal impact of this disease, dementia has an immense (and growing) world-wide societal impact. Although its true financial impact is impossible to measure (and is certainly underestimated), the costs of dementia in the United States already exceeds one percent of the global gross domestic product (GDP).

Stage 1-2 dementia is typically referred to as mild cognitive impairment (MCI) or vascular cognitive impairment (VCI). Experimental studies (mainly involving animals) have been conducted to assess the role of glutamate and medical research on both animals and humans. These studies show that mentally stimulating activities are related to measurable improvements in brain vascular health, and in both brain structure (i.e. neurogenesis) and function (i.e., formation and reactivity of synapses). More importantly, neuroscience research demonstrates that when neural binding occurs (primarily through novel learning approaches) neurons release Glutamate, an excitatory neurotransmitter. This neurotransmitter, among other things, signals to the rest of the brain to decrease the amount of cortical atrophy. Although a certain amount of cortical atrophy does occur during the aging cycle, individuals with dementia do experience an unnaturally steep and progressive acceleration of atrophy secondary to glutamate loss. Persistent and targeted new learning approaches are essential to prevent the steep deceleration of cortical shrinkage.

Cognitive intervention occurs when subjects initiate multiple novel learning sessions, which promote neural binding and the release of glutamate, and serve to decrease the progression of cortical atrophy. This process involves mentally stimulating a cognitively impaired individual (i.e., brain exercises for a sick brain) to help grow new brain connections and limit the progression of functional and neurocognitive impairments with are inherent in dementia. Research has shown that not just any brain exercises will suffice. Specifically, brain exercises that are new and novel are required. Too many existing "brain games" fail by convincing our seniors that something they have down repeatedly (e.g., bridge, crossword puzzles) will be beneficial in decreasing the extent of their dementia. This approach is not based on current clinical science.

What is needed is a system and method for cognitive intervention for patients with early-stage dementia; more particularly, a system and method that assesses and enhances the cognitive capabilities of patients that have been diagnosed with dementia in the earliest stages (i.e., Stages 1-2), and prevent the onset/lessen the progression of neurocognitive decline. The present invention fulfills these needs as well as other needs.

BRIEF SUMMARY OF THE INVENTION

One aspect of the present invention is directed to a method for assessing and enhancing a cognitive ability of a user with early-stage dementia. The method may comprise the steps of: receiving at least one personalization parameter provided by the user; allowing for the display of at least one cognitive exercise; allowing the user to interact with the at least one cognitive exercise; receiving cognitive data based on the interaction of the at least one cognitive exercise by the user; generating an exercise score based at least in part on the cognitive data; and utilizing the exercise score and the at least one personalization parameter to generate a cognitive ability score, wherein the generated cognitive ability score is utilized in determining a subsequent cognitive exercise to be displayed to the user.

The at least one personalization parameter may be one or more of background information of the user and personality traits of the user. The background information of the user may include one or more of the user's date of birth, gender, marital status, city of residence, highest education completed, work status, occupation, interests, and motivation. The personality traits of a user may include one or more of need for affection, warmth, and conscientiousness. Further, the cognitive data may include one or more of an amount of time user spends interacting with the at least one cognitive exercise, a determination of whether the interaction with the at least one cognitive exercise was a success or failure, and a level of difficulty of the at least one cognitive exercise.

The method may further comprising the steps of receiving sounds and speech of the user during the interaction of the at least one cognitive exercise by the user, and recording the received sounds and speech, wherein the cognitive data includes the recorded sounds and speech. The method may also comprise the step of storing the at least one personalization parameter, the at least one cognitive exercise, and the exercise store, and the cognitive ability score in a memory. Also, the step of allowing the user to interact with the at least one cognitive exercise may include the step of allowing for the selection of an answer from two or more possible answers related to the cognitive exercise.

In other aspects, the method may further comprise the step of displaying the cognitive ability score to the user. The method may further comprise the step of comparing the cognitive ability score of the first user with a cognitive ability score of a second user, wherein the first user and the second user are associated in a group. Further, a difficulty level may be adjusted for the subsequent cognitive exercise based on the cognitive ability score. Also, the method may further comprise the step of providing motivation to the user during the interaction with the at least one cognitive exercise. Moreover, in another aspect, the interaction with the at least one cognitive exercise does not require a physical activity, such as operating a keyboard.

Another aspect of the present invention includes a non-transitory computer readable medium having thereon computer executable instructions for performing the above-referenced method.

Further, a system for assessing and enhancing a cognitive ability of a user with early-stage dementia is provided, wherein the user interacts with the system using a user computing device over a network. The system may comprise a central computing device, such as a server, in communication with the network, wherein the computing device includes a memory, and wherein at least one personalization parameter and at least one cognitive exercise is stored in the memory. The system may also include a cognitive exercise module stored in the memory, wherein the cognitive exercise module includes an exercise application programming interface (API) and an exercise engine. The exercise engine operates to display the at least one cognitive exercise, and the exercise API operates to collect cognitive data based on an interaction of the at least one cognitive exercise by the user. An exercise score is generated based at least in part on the cognitive data. The exercise score and the at least one personalization parameter is utilized to generate a cognitive ability score, wherein the generated cognitive ability score is utilized in determining a subsequent cognitive exercise to be displayed to the user.

The cognitive exercise module in the system may further include an exercise registration module that operates to register the at least one cognitive exercise in an exercise library. Further, the at least one personalization parameter and the cognitive exercise score may be associated with the user in a user profile database.

Additional benefits and aspects of the above-described system and method are set forth below in the following discussion.

BRIEF DESCRIPTION OF THE DRAWINGS

The disclosure is illustrated and explained by way of example figures of the accompanying product screen captures and diagrams in which like references indicate similar elements. These represent only a subset of the capabilities and logic in the system.

FIG. 5A is a screen shot showing a user background information screen displayed to a user in an exemplary implementation of the present invention;

FIG. 6A is a screen shot showing an introductory user personality trait screen displayed to a user in an exemplary implementation of the present invention;

FIG. 6C is a screen shot showing an example of a user personality trait question;

FIG. 7D is a flow chart showing an exemplary work flow for the cognitive exercise shown in FIG. 7C;

FIG. 10F is a screen shot showing termination of a session of one or more cognitive exercises;

DETAILED DESCRIPTION OF THE INVENTION

Generally, the tools, systems, and methods described herein for assessing and enhancing cognitive capabilities of patients with early-stage dementia, and preventing the onset/lessen the progression of neurocognitive decline, may be implemented in hardware, software or a combination thereof, and may be distributed across a variety of computing devices.

This document is organized as follows: In the first section, an overview of the techniques and implementation is provided and described along with an exemplary network environment. In the next section, an exemplary work flow and implementation for the cognitive enhancement method is provided, including the operational functions of the present invention. Finally, an exemplary computer environment for the implementation of the system and method of the present invention is described.

In one exemplary aspect, the required human process, algorithms, and exercises to implement the present system and method are provided for autonomous use by patients and any interested users through a cognitive exercise module which may take the form of computer-executable instructions that is accessible over a network, such as the Internet, to be delivered by popular and easy-to-use computer devices, including laptops, touch-screen tablets, and smartphones. All patient assessment and response data may be automatically accumulated, sent via the Internet to a centralized database, used to customize the cognitive intervention exercises, feedback to the users, and provide a basis for further research into the problem and rehabilitation. The system and method of the present invention may be implemented in a modular software architecture based on a service-oriented model that incorporates best practices from the Model-View-Controller (MVC) paradigm and Representational State Transfer (REST) architecture. The core of the model is a common services framework that acts as the intermediary to serve critical functions including authentication and authorization, persistence, business logic processing, and state management. This layer abstracts the complex business logic and technical implementations of the backend system. Specific user interface logic that is browser or mobile device specific is contained in presentation-level views which will be discussed in more detail below. Persistent storage may be represented by a relational database platform.

Figure 1:
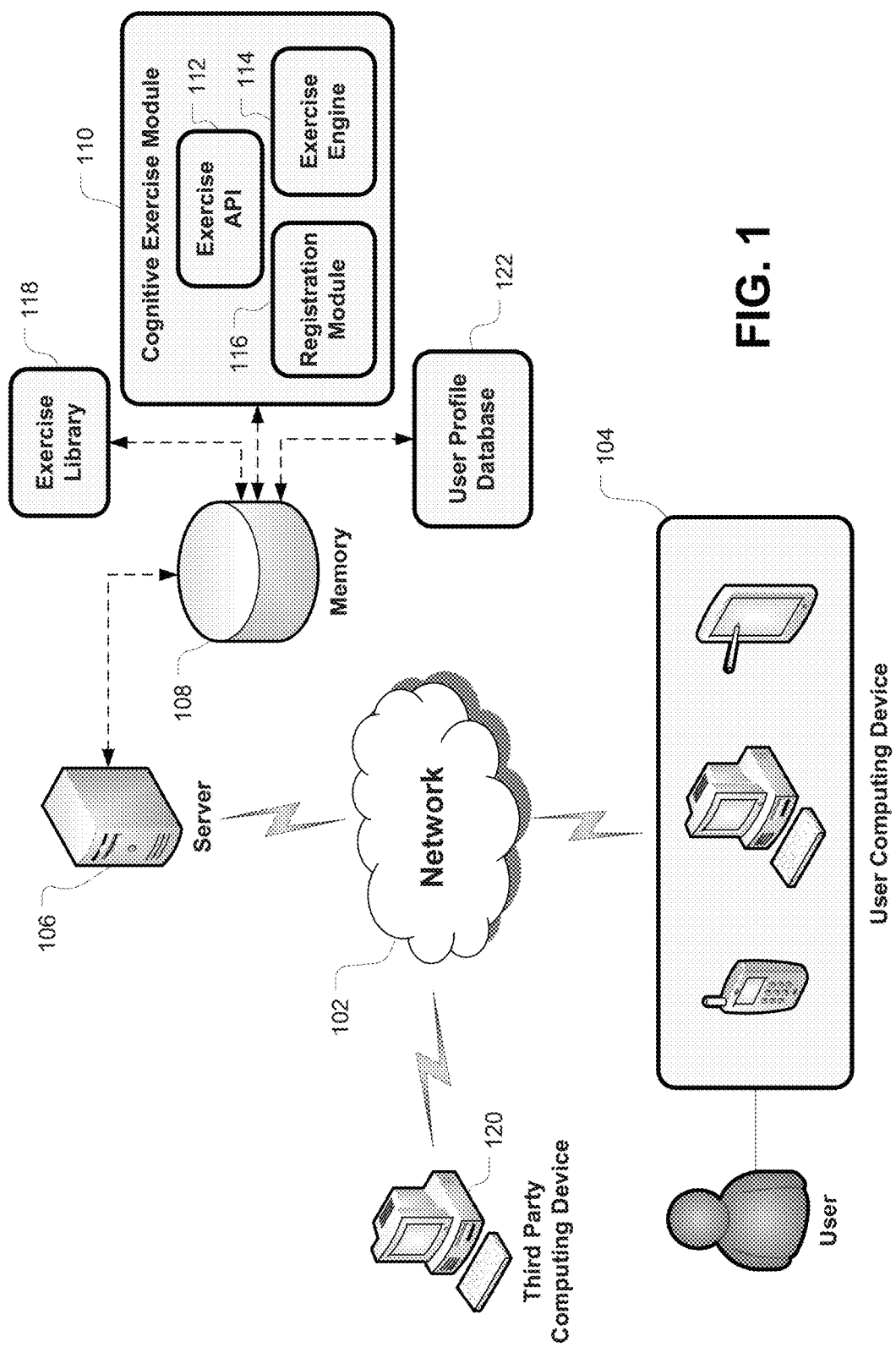
FIG. 1 is a schematic system diagram generally illustrating various components that may be utilized for the implementation of some of the aspects of the present invention.

Referring to the drawings, and initially to FIG. 1, an exemplary system for implementing the method of the present invention is provided and is identified as reference number 100. In general, the system 100 may include a communication network 102, such as a Local Area Network (LAN), Wide Area Network (WAN)(e.g., Internet), wireless network or other similar configuration for allowing communication among two or more computing devices. Connected to network 102 may be a user device 104 that is operated by patients and any interested users of the present invention. User device 104 may include devices such as handheld devices, smart phone, tablets, smart watch, augmented reality glasses, laptop computers or personal computers, which may be located in a home, health care provider location, office or other environment, and that provide an interface for user interaction with local or remote applications or systems. Further, user device 104 may configured to communicate with a server 106 (or central computing device) through network 102 either through a wireless or wired connection, wherein server 106 includes a memory 108 that is used to store the cognitive exercise module, which is identified with reference number 110. Server 106 may be utilized to provide any one or more of a variety of functions including serving as a web server, data store, an application server and/or provide other services. Server 106 may include a platform architecture based on an implementation of Representational State Transfer (REST) pattern to provide for highly maintainable and performing applications. Server 106 may serve as a platform for website and mobile applications designed for consumption through various mediums, including but not limited to any of the forms of user devices mentioned above.

With continued reference to FIG. 1, cognitive exercise module 110 may include an exercise application programming interface (API) 112, an exercise engine 114, and an exercise registration module 116. Exercise API 112 operates to formally structure the relationship between a cognitive exercise and the interaction of the cognitive exercise with the user using user device 104. For example, exercise API 112 may be used to collect the following cognitive data that results from a user interacting with a cognitive exercise displayed on user device 104:

Exercise ID (int)—used to uniquely identify the cognitive exercise within a library 118 including a plurality of cognitive exercises stored in memory 108;

Exercise Title (string)—descriptive title that can be displayed for the cognitive exercise;

Developer Key (string)—used to identify a creator of the cognitive exercise and to validate the authenticity of the exercise to reduce the chance of false exercises being stored in library 118;

Elapsed Time (int)—used to collect the amount of time (e.g., in seconds) spent on the cognitive exercise by a user of user device 104;

Measureable (boolean)—used to identify whether the cognitive exercise can be scored as either a success or failure;

Result (boolean)—used to determine whether interaction with a cognitive exercise was successful (true) or not (false). Only applicable when Measureable=true;

Level of Difficulty (int)—used to identify the level of difficulty of the cognitive exercise. Specify value from valid enumeration of levels of difficulty;

Zoomable (boolean)—used to define whether the exercise can be zoomed in or out by the user of user device 104. The zoom function may be provided by cognitive exercise module 110 or locally by user device 104.

Exercise engine 114 may be a series of computer-executable algorithms included within cognitive exercise module 110 that are used to determine the type of cognitive exercises and/or quantity of cognitive exercises included within library 118 that will be used by cognitive exercise module 110 in implementing the method. Exercise engine 114 personalizes the experience for the user based at least in part on one or more personalization parameters. Cognitive exercise module 110 may be dynamic in that it improves in accuracy each time a user engages in their program activities. Exemplary personalization parameters that may be used by exercise engine 114 to customize the user experience include, but are not limited to, one or more of user background information and user personality traits. Initially, exercise engine 114 utilizes the personalization parameters in conjunction with an initial mental status score to generate an initial cognitive ability score that is used to determine the type and/or quantity of cognitive exercises displayed to the user. Cognitive exercise module 110 may further personalize and dynamically change the type and quality of cognitive exercises displayed to the user by further using subsequent exercise scores from exercise program activity collected from exercise API 112, which is thereafter used in conjunction with the personalization parameters to generate an updated cognitive ability score. This refinement of the cognitive ability score continues each time the user utilizes cognitive exercise module 110.

Exercise registration module 116 is used to register a cognitive exercise into library 118 so that it will be available for selection by exercise engine 114 and made available to users using user devices 104. The exercise registration process comprises a workflow to provision and categorize the cognitive exercise, the latter of which rates the cognitive benefit potential and classifies the cognitive exercise within an exercise category (e.g., Attention & Concentration, Memory, Speech & Language, Speed of Processing, Mood and Psychological Issues). Exercise registration module 116 also allows configuration of various exercise information collected by cognitive exercise module 110 as described above with respect to exercise API 112. Each cognitive exercise may exist within library 118 using a sandboxing technique to minimize the risk of introducing security vulnerabilities. One approach may be based on the GOOGLE® CAJA project, which enables third party embedding of scripts. Cognitive exercises included in library 118 may be developed as part of cognitive exercise module 110; however, exercise registration module 116 may also enable support for a type of exercise crowdsourcing which would allow third parties to add cognitive exercises to library 118 using third party computing devices 120 through network 102.

Figure 2:
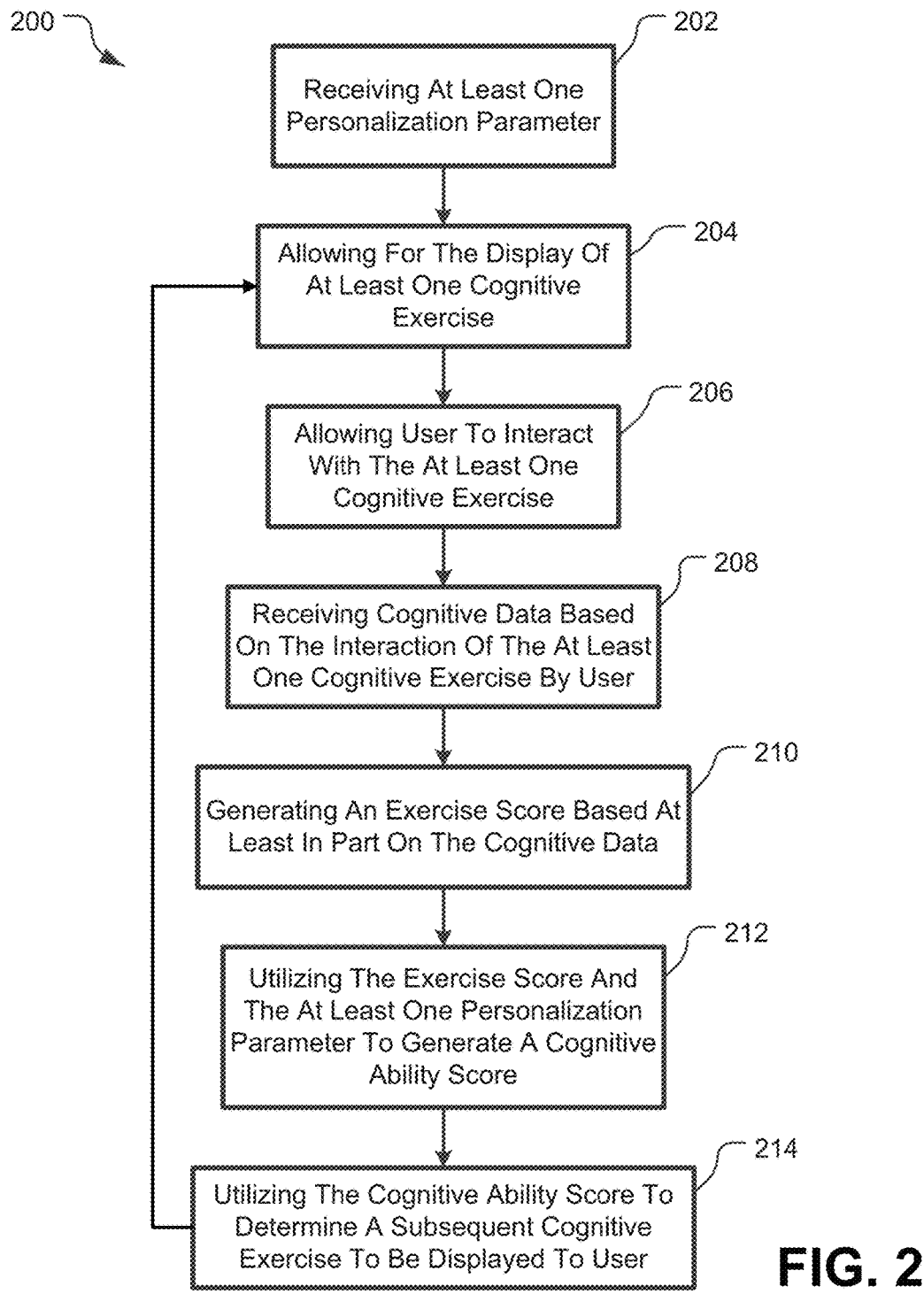
FIG. 2 is a flow chart illustrating an exemplary method that may be used in conjunction with the system shown in FIG. 1 to implement the present invention.

In accordance with an aspect of the present invention, with reference to the flow chart 200 set forth in FIG. 2, cognitive exercise module 110 may be used in conjunction with system 100 to execute a method for assessing and enhancing cognitive abilities of a user with early-stage dementia, wherein the method comprises the steps of: receiving at least one personalization parameter provided by the user, at step 202; allowing for the display of at least one cognitive exercise at step 204; allowing the user to interact with the at least one cognitive exercise at step 206; receiving cognitive data based on the interaction of the at least one cognitive exercise by the user at step 208; generating an exercise score based at least in part on the cognitive data at step 210; and utilizing the exercise score and the at least one personalization parameter to generate a cognitive ability score at step 212, wherein the generated cognitive ability score is utilized in determining a subsequent cognitive exercise to be displayed to the user, at step 214. The method may then repeat by returning to step 204. It should be understood that the user may update his or her personalization parameter(s) over time, wherein the updated personalization parameters may then be used to generate the respective cognitive ability score.

The aspects of the present invention and the advantages thereof can be further appreciated by considering a representative implementation described with reference to FIG. 3A through FIG. 16B.

Figure 3A:
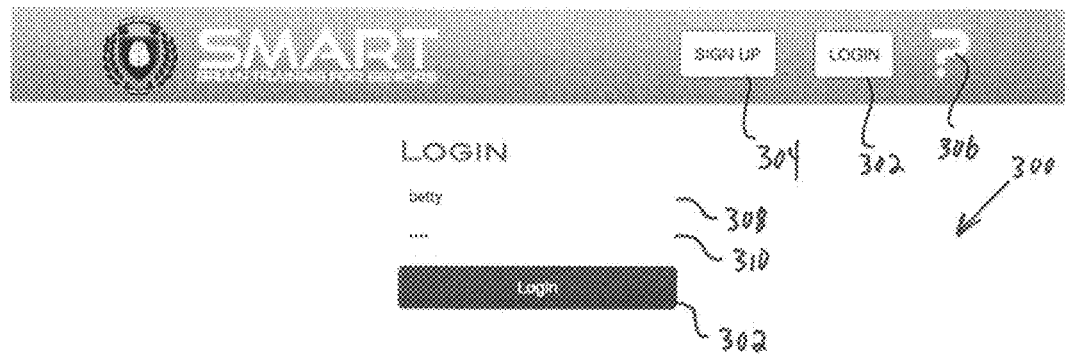
FIG. 3A is a screen shot showing a login screen displayed to a user in an exemplary implementation of the present invention.

FIG. 3A illustrates a screen shot showing a login screen 300 that may be displayed to a user on user device 104 through the operation of cognitive exercise module 110. The login screen 300 allows user to access his or her user profile stored in a user profile data base 122 (FIG. 1), associated data required to start or continue an exercise program using cognitive exercise module 110, and selected activities that are accessible from user device 104. A simple screen image is displayed, with a login button 302 that may be clicked for a user with an existing profile to connect to data in user profile database 122, and a sign up button 304 for new users to register with the system, and an online help button 306 if more information is required. For existing users, fields 308, 310 are provided for user identification and password entry. If errors are made during data entry, appropriate error messages are displayed on user device 104.

Figure 3B:
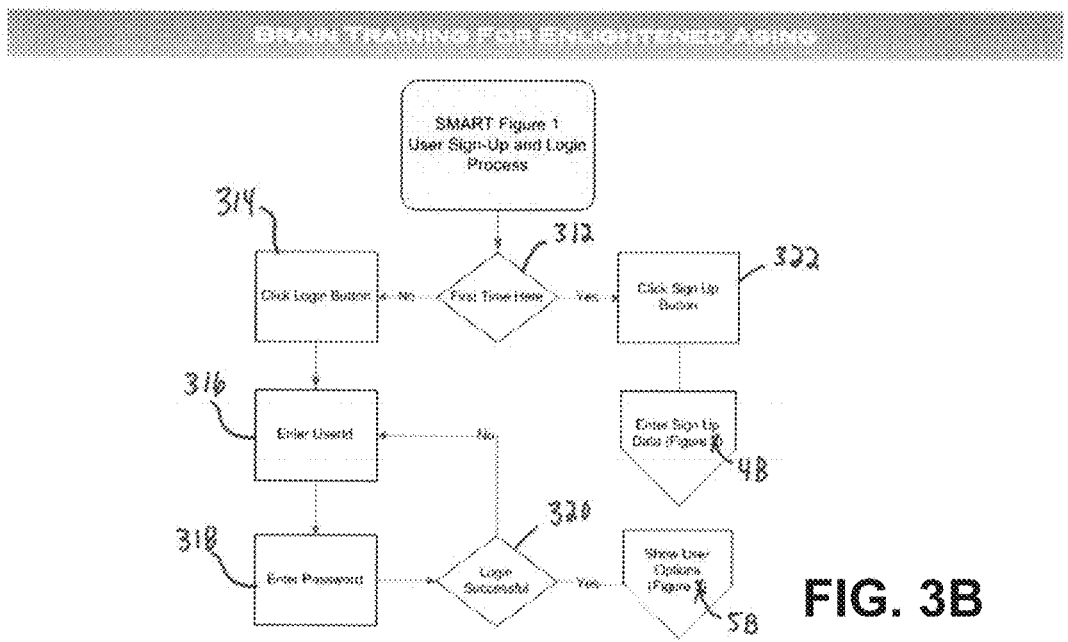
FIG. 3B is a flow chart generally showing a procedure for utilizing the login screen shown in FIG. 3A.

With additional reference to FIG. 3B, the work flow begins with a determination of whether the user is an existing user at step 312. If the user is an existing user at step 312, login button 302 is selected at step 314. Thereafter, a user login identification is entered in field 308 at step 316, and a user password is entered in field 310 at step 318. Cognitive exercise module 110 may then determine if the entered user login identification and user password match an existing user login identification and user password stored in user profile data base 122. If there is a match at step 320, then the work flow continues with reference to FIGS. 9A-9B. If there is no match at step 320, then the work flow reverts to step 316. If the user is a new user at step 312, sign up button 304 is selected at step 322 and the work flow continues with reference to FIGS. 4A-4B.

Figure 4A:
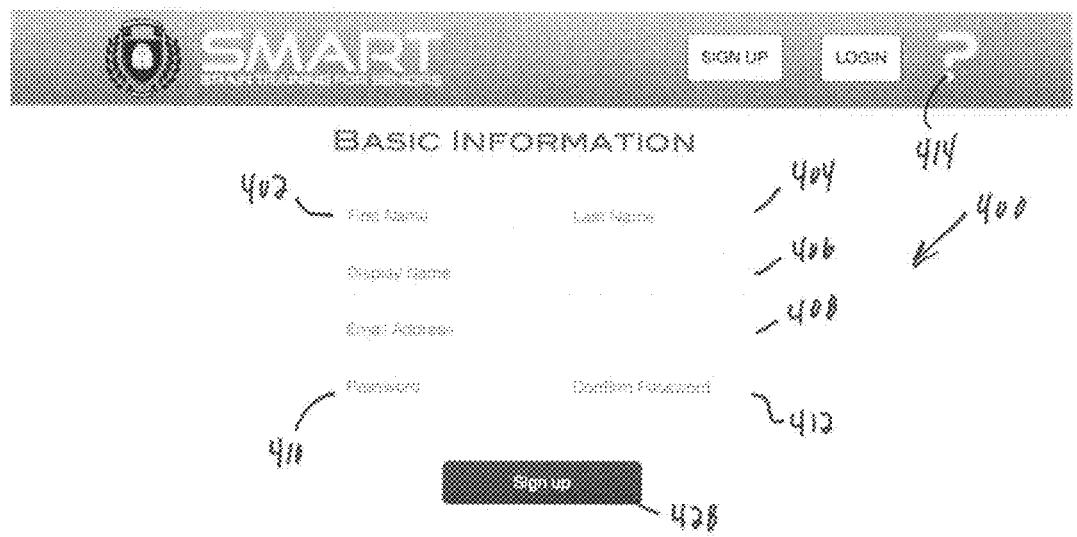
FIG. 4A is a screen shot showing a new user registration screen displayed to a user in an exemplary implementation of the present invention.

FIG. 4A illustrates a screen shot showing a new user registration screen 400 that may be displayed to a user on user device 104 through the operation of cognitive exercise module 110. New user registration screen 400 allows the new user to enter and store required information in user profile database 122, such as, but not limited to, a valid user first name in field 402, last name in field 404, display name in field 406, email address in field 408, and password in field 410. The password may be specified a second time in field 412 for validation and confirmation with the password that was entered in field 410. Appropriate help messages and prompting are included for easy use. On this screen, there is also a help button 414 to get additional guidance, and a user image button (not shown) to bring up other options which will be described in relation to other screen shots.

Figure 4B:
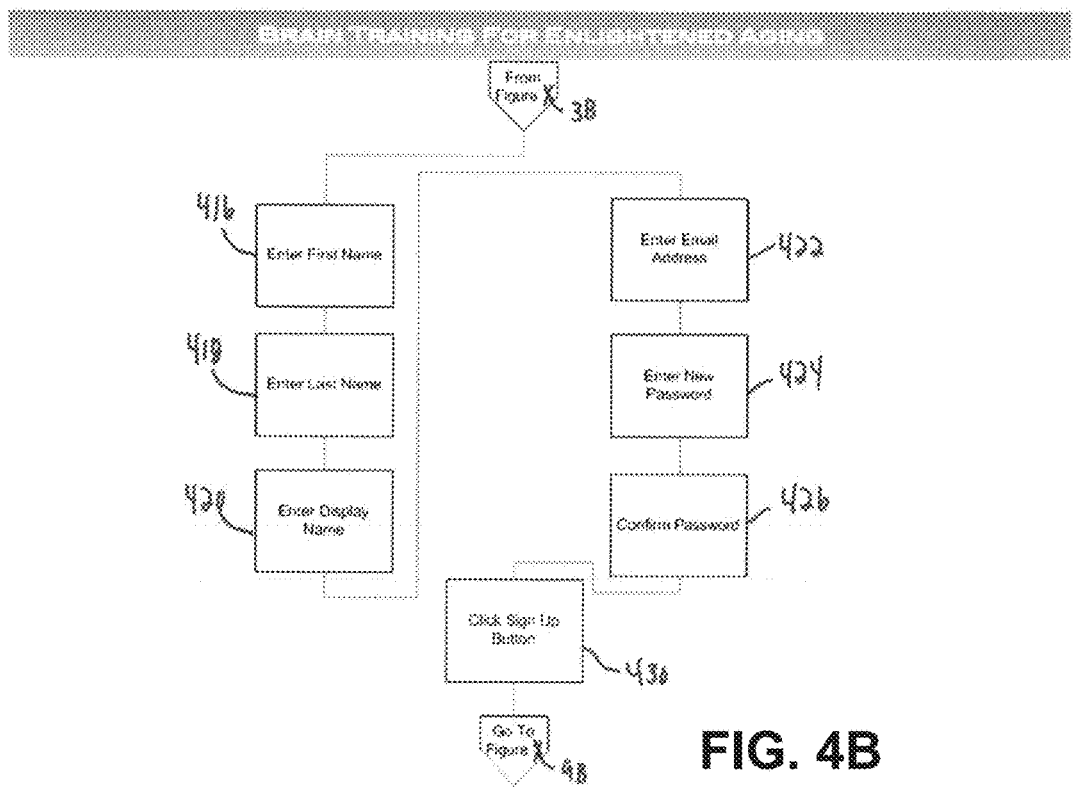
FIG. 4B is a flow chart generally showing a procedure for utilizing the new user registration screen shown in FIG. 4A.

With additional reference to FIG. 4B, the work flow continues from step 322 in FIG. 3B whereby the valid user first name is entered in field 402 at step 416, last name is entered in field 404 at step 418, display name is entered in field 406 at step 420, email address is entered in field 408 at step 422, and password is entered in field 410 at step 424. The password may be entered a second time in field 412 at step 426 for validation and confirmation with the password that was entered in field 410. After the aforementioned user information is entered, the sign up button 428 is selected at step 430, and the work flow proceeds to an initial cognitive assessment whereby one or more personalization parameters from the user related to user background information personality traits, and current mental status are received from user device 104 and stored by cognitive exercise module 110.

As best seen in FIG. 5A through 7D, in implementing the initial cognitive assessment, the user is led through a series of interactive screens to build user background information, user personality traits, and engage in one or more cognitive exercises to generate an initial mental status score. All information collected is used by cognitive exercise module 110 in presenting the user with exercises and information most relevant to their needs. The data is collected using a plurality of interactive question/answers. The answers to the questions presented are stored in association with the user's profile in user profile database 122 and used by exercise engine 114 to determine the best exercising regimen for the user.

Figure 5B:
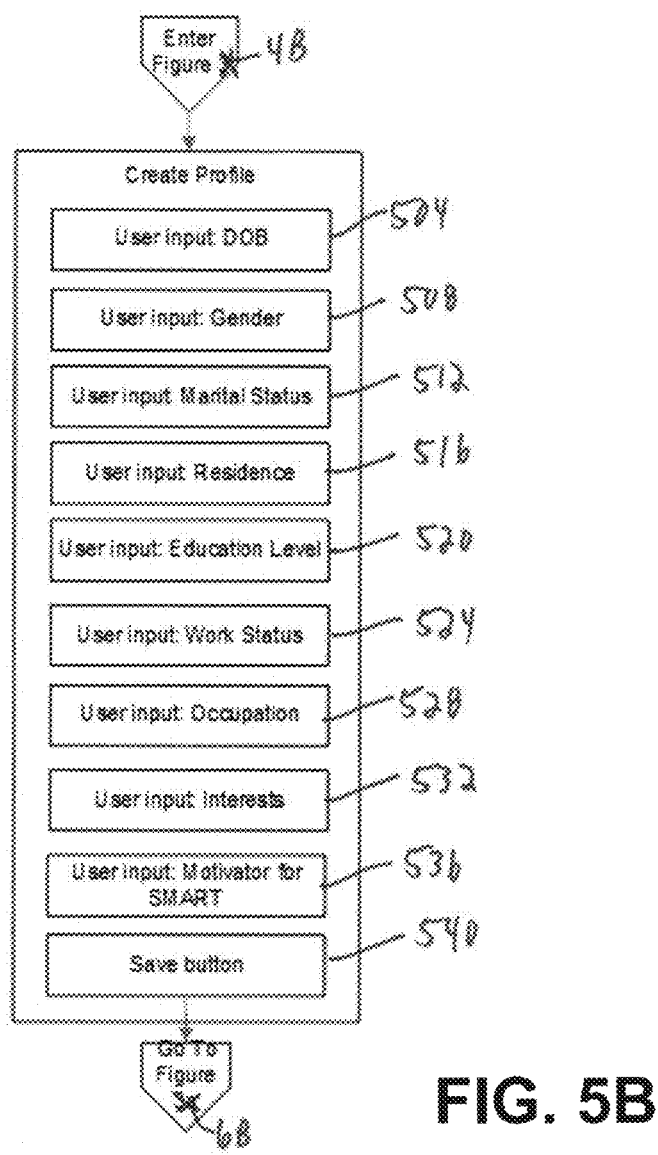
FIG. 5B is a flow chart generally illustrating a procedure for utilizing the user background information screen shown in FIG. 5A.

As best seen in FIGS. 5A and 5B, a screen shot 500 is shown illustrating a user interface that allows a user to develop a profile by entering or selecting his or her background information for storage and subsequent use by cognitive exercise module 110. In particular, the user interface may allow for the selection of the user's date of birth in field 502 at step 504, gender in field 506 at step 508, marital status in field 510 at step 512, city of residence in field 514 at step 516, highest education completed in field 518 at step 520, work status in field 522 at step 524, occupation in field 526 at step 528, interests in field 530 at step 532, and the user's motivation for using cognitive exercise module 110 in field 534 at step 536. It should be understood that other background information may also be used in the present system and method. After entering the above-referenced background information, a save button 538 may be selected at step 540, which results in the background information being stored in user profile database 122 in association with the user information entered in FIGS. 4A-4B. The initial cognitive assessment may then continue with an evaluation of the user's personality traits.

Figure 6B:
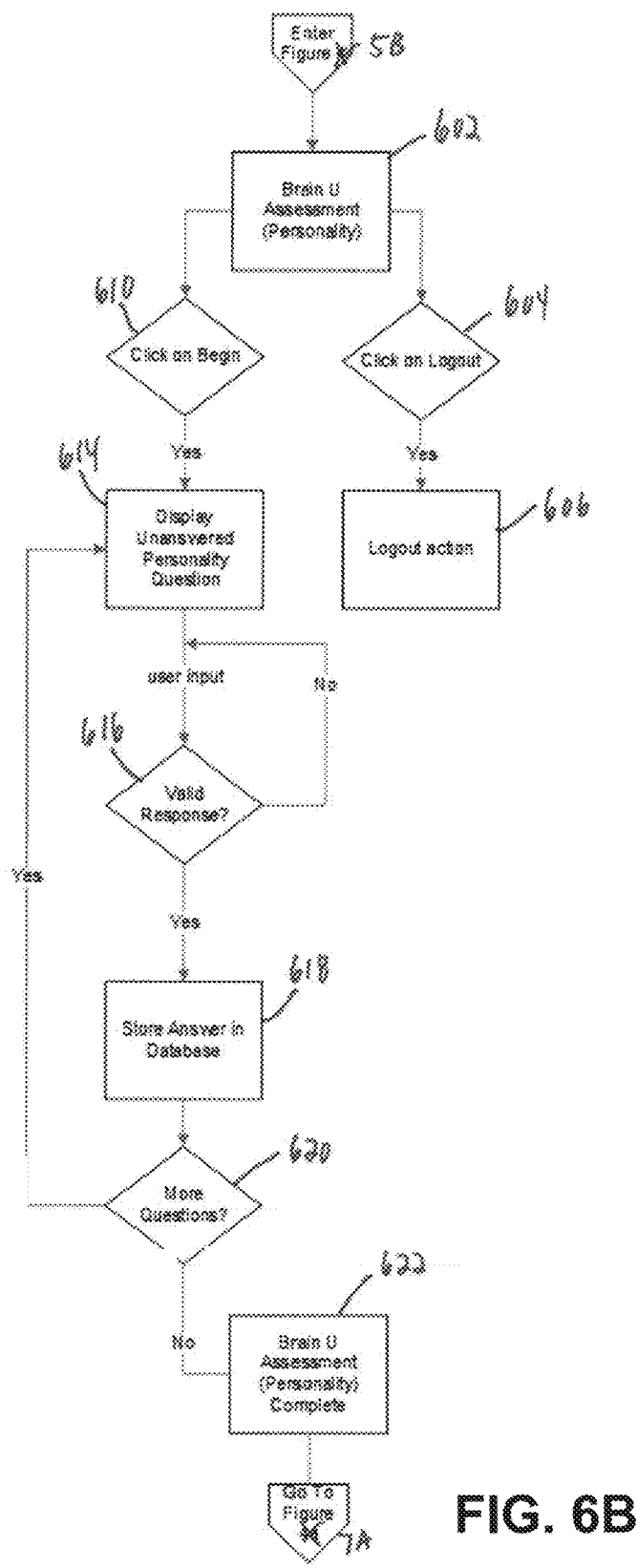
FIG. 6B is a flow chart generally illustrating a procedure for utilizing the user personality trait screen shown in FIG. 6A.

As best seen in FIG. 6A, an exemplary screen shot 600 is shown illustrating a user interface that allows a user to further develop his or her profile by answering a one or more questions directed to identify personality traits of the user for storage and subsequent use by cognitive exercise module 110. In particular, the user interface may be used to gauge a user's personality and may include components such as a user's need for affection, warmth, and conscientiousness, for example. Some personality trait questions may include one question or multiple questions. With additional reference to FIG. 6B, a work flow continues from step 540 in FIG. 5B and begins at step 602. The user may have the option of terminating the initial cognitive assessment by clicking on a logout button at step 604 and logging out of the module 110 at step 606. If the user decides to proceed with the personality trait evaluation, user would click the begin button 608 at step 610, which results in the display of exemplary screen shot 612 in FIG. 6C at step 614. With reference to FIGS. 6B and 6C, one or more personality trait answers are then received by cognitive exercise module 110 and a determination is made as to whether the one or more answers is valid at step 616. If it is determined that the one or more answers are valid, then the one or more answers are then stored in user profile database 122 at step 618 in association with the user information entered in FIGS. 4A-4B. One or more additional new or unanswered personality trait questions may then be displayed by user device 104 at step 620. If there are no additional or unanswered questions available, then the personality trait assessment is complete at step 622. The initial cognitive assessment may then proceed to an evaluation of the user's mental status.

Figure 7A:
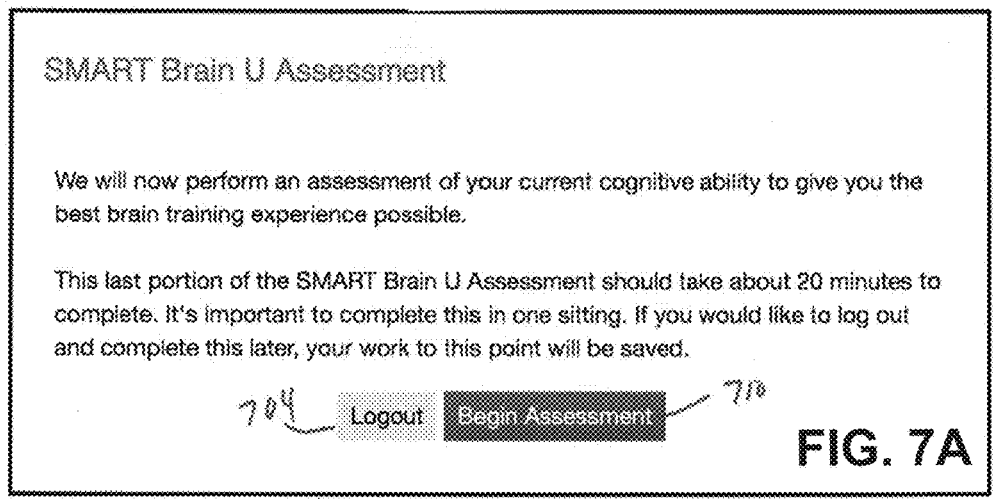
FIG. 7A is a screen shot showing an introductory screen for determining an initial mental status score in an exemplary implementation of the present invention.
Figure 7C:
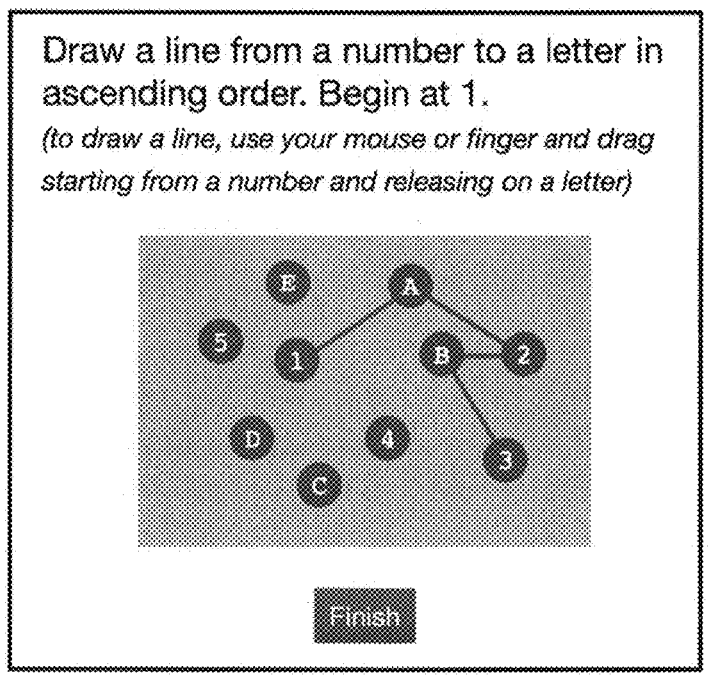
FIG. 7C is a screen shot showing an example cognitive exercise that is used to determine the initial mental status score.

As best seen in FIG. 7A, an exemplary screen shot 700 is shown illustrating a user interface that allows a user to further develop his or her profile by generating an initial mental status score by undertaking an initial cognitive assessment for storage and subsequent use by cognitive exercise module 110. In general, the initial cognitive assessment is a series of one or more questions that test's a user's cognitive function. The cognitive assessment may include, but is not limited to, areas such as visuospatial function, memory, attention, language, abstraction, and orientation. Each of these areas provides one or more cognitive exercises that, through a user interface on user device 104, provide interactivity for the user. For example, the initial mental status score may be based on a score out of 30 points. User's that score 25 and above, for example, are considered to have normal cognitive function. Users scoring 21 or less, for example, may be referred to a physician for an in-person evaluation, but oftentimes are classified as having mild cognitive impairment or some form of early stage dementia.

Figure 7B:
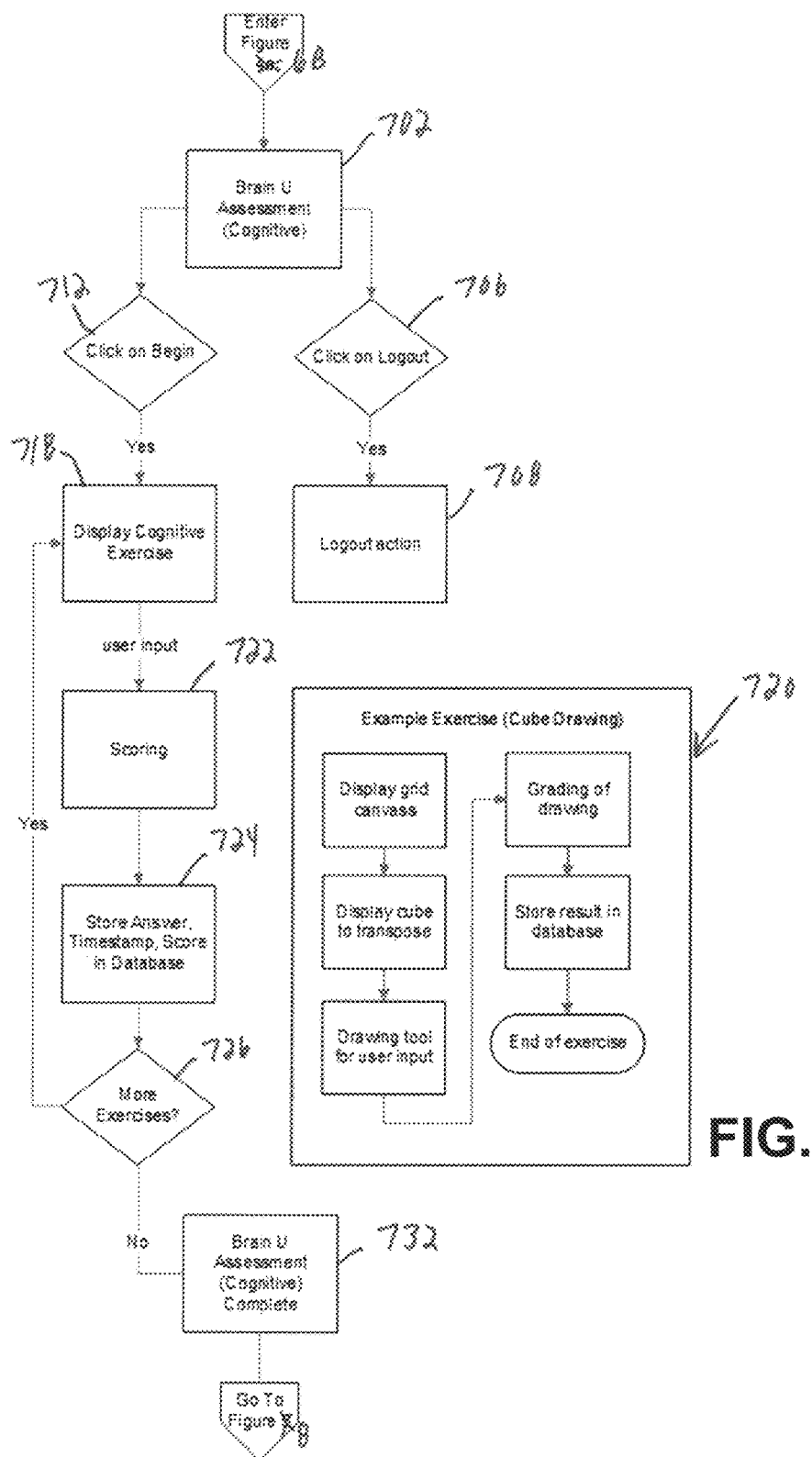
FIG. 7B is a flow chart generally illustrating a procedure for determining the initial mental status score shown in FIG. 7A.
Figure 7E:
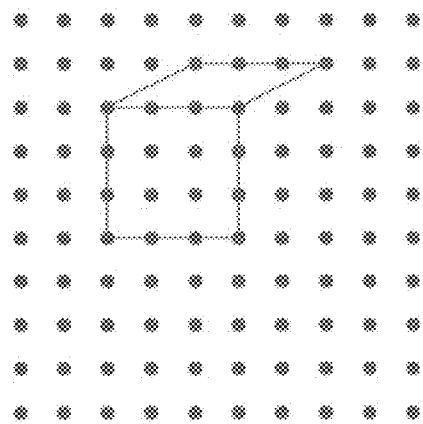
FIG. 7E is a screen shot showing another example cognitive exercise that is used to determine the initial mental status score.
Figure 7F:
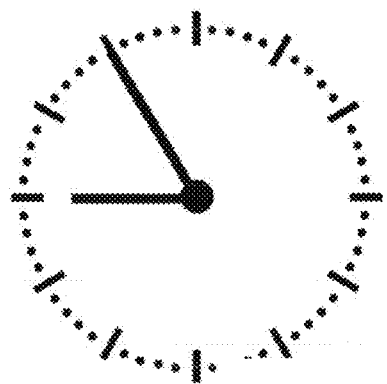
FIG. 7F is a screen shot showing yet another example cognitive exercise that is used to determine the initial mental status score.

With further reference to FIG. 7B, a work flow continues from step 622 in FIG. 6B and begins at step 702. The user may have the option of logging out of the initial cognitive assessment by clicking on a logout button 704 at step 706 and logging out of the module 110 at step 708. If the user decides to proceed with generating the mental status score, user would click the begin assessment button 710 at step 712, which results in the display of exemplary screen shot 714 in FIG. 7C at step 718. The exemplary cognitive exercise shown in FIG. 7C may be stored in library 118 and retrieved and provided for display by cognitive exercise module 110. The exercise shown in FIG. 7C requires the user to link a pattern of letters and/or numbers using an interactive drawings tool, as set forth in the exemplary work flow 720 depicted in FIG. 7D. Based on the input received from user device 104 after each exercise, cognitive exercise module 110 generates an exercise score at step 722, which is stored in user profile database 122 in association with the user at step 724. It should be understood that the cognitive data that is collected by exercise API 112, as discussed previously, may be used to generate the exercise score. A determination is then made as to whether any additional cognitive exercises are necessary to obtain the initial mental status score at step 726. If additional exercises are provided, such as cognitive exercises 728, 730 in FIGS. 7E and 7F, then the work flow proceeds back to step 718. If no additional cognitive exercises are required, the work flow proceeds to step 732 where the initial mental status score is calculated by cognitive exercise module 110 and stored in user profile database 122.

Figure 8:
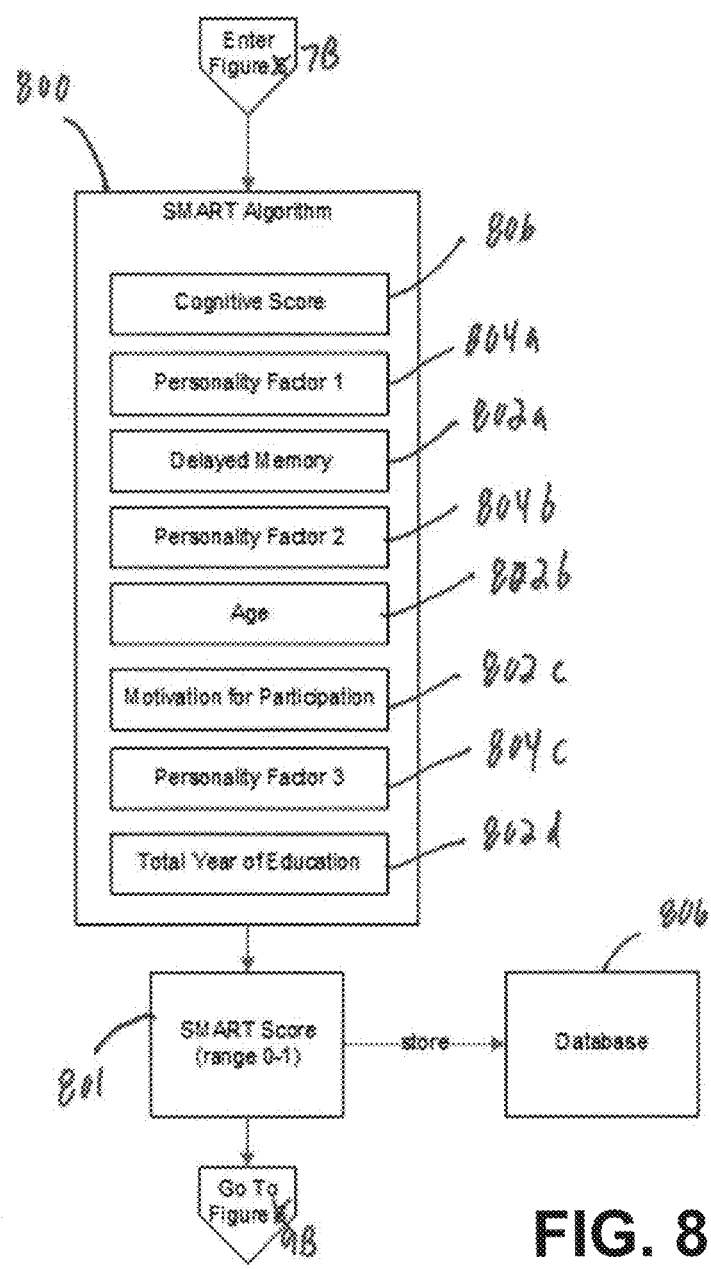
FIG. 8 is a flow chart showing an exemplary algorithm showing the variables used to calculate a cognitive ability score.

FIG. 8 illustrates the variables that cognitive exercise module 110 uses in a computer executable algorithm 800 to calculate an initial cognitive ability score 801. In particular, initial cognitive ability score 801 may be generated based on personalization parameters such as the aforementioned user background information 802a, 802b, 802c, 802d and personality traits 804a, 804b, 804c, as well as initial mental status score 806. Initial cognitive ability score 801 can be used by exercise engine 114 to determine the type and/or number of cognitive exercises to be displayed to the user to enhance cognitive ability through subsequent use of cognitive exercise module 110. Initial cognitive ability score 801 may also be used to group a user into a certain class appropriate for the user's cognitive ability. Algorithm 800 may be a type of linear regression that is used to calculate the score initial cognitive ability score 801. An exemplary initial cognitive ability score 801 may be defined as follows:

$$\text{Cognitive ability score} = B1*X1+B2*X2+B3*X3+B4*X4+B5*X5+B6*X6+B7*X7+B8*X8$$

where:
Mental Screen Total Score (X1), B1=0.40
1 Personality Factor (X2), B2=0.15
Delayed Memory (X3), B3=0.15
2 Personality Factor (X4), B4=0.10
Age (X5), B5=0.05
Motivation for Doing SMART*(X6), B6=0.05
3 Personality Factor (X7), B7=0.05
Total Years of Education Completed (X8), B8=0.05

For the above, Bn represents the weighting per factor. The resultant from SMART Score is a decimal between 0 and 1 and is converted into a percentage, which may be used by cognitive exercise module 110 in various capacities, such as those described herein. Algorithm 800 is applied during the initial registration and setup process, but also at select intervals over time based on the user's progression, as will be discussed below.

Figure 9A:
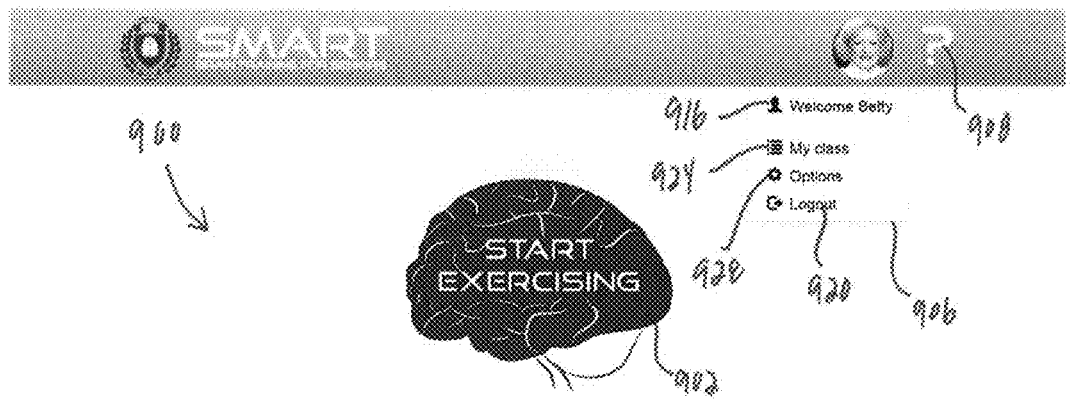
FIG. 9A is a screen shot showing an example display allowing a user to start one or more cognitive exercises.

After the initial cognitive ability score 801 is generated by algorithm 800, it is stored at step 806 in user profile database 122 in association with the user, and the work flow proceeds to the screen shot 900 illustrated in FIG. 9A, wherein a start exercising button 902 is generated by displayed on user device 104. Clicking on the brain image 902 in the center of the display is an intuitive way to immediately get to puzzles that are used to exercise the brain. In addition, the user may click on their own image 904, displaying a dialog box 906 with other options 908, including access to user profile data, a summary and images of other users in your own group, access to icons to the user's current personal assessment, an opportunity to build or customize other exercises, a personal calendar of activities, and another way to start the brain exercise session. On this screen 900, there is also a help button 910 to get additional guidance.

Figure 9B:
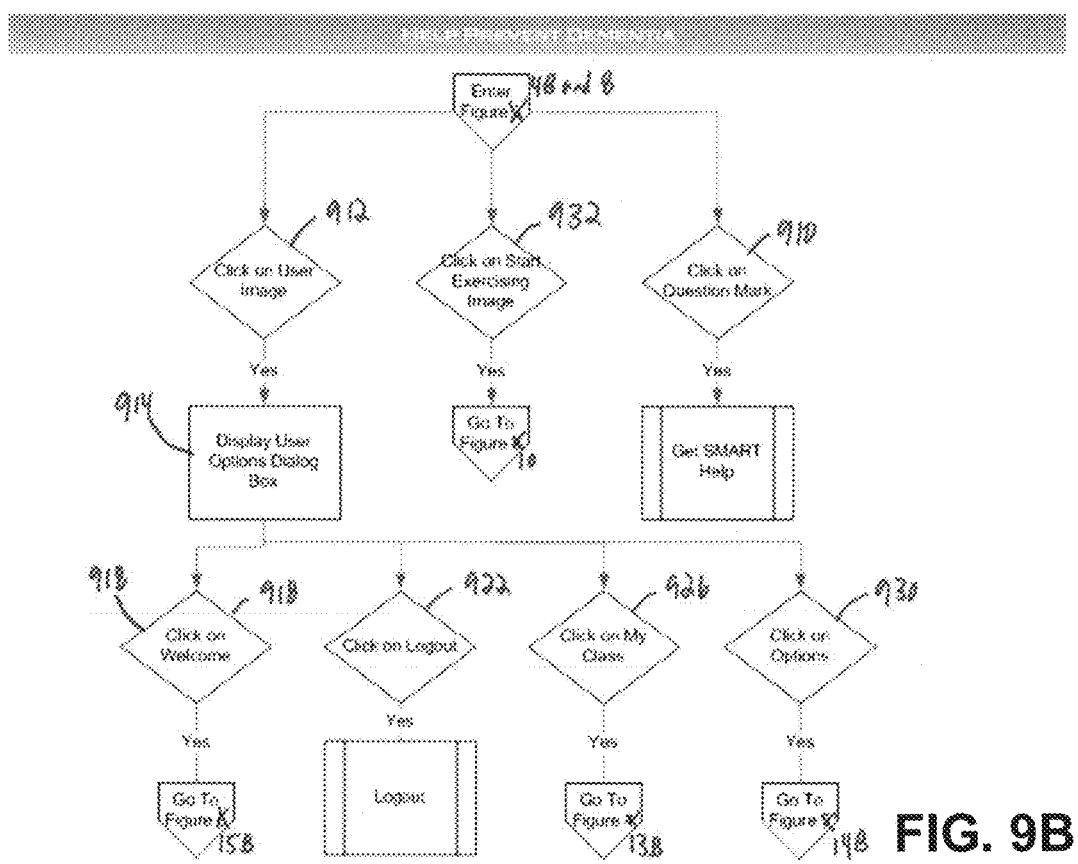
FIG. 9B is a flow chart showing an exemplary work flow for allowing the user to begin cognitive exercises as presented in FIG. 9A and utilize other options provided by the cognitive exercise module.

With additional reference to FIG. 9B, a work flow continues from step 801 in FIG. 8B wherein cognitive exercise module 110 operates to allow the user to click on the question mark button 908 at step 910 which will result in the display of information helpful to the user in using cognitive exercise module 110. The user also is able to click on the user image 904 at step 912 whereby options dialogue box 906 is displayed at step 914 and presents the user with the option of clicking on a welcome button 916 at step 918 which will result in the display of a my profile screen (FIG. 15A), a logout button 920 at step 922, a my class button 924 at step 926 which will result in the display of a screen showing one or more other users associated with the user in a group (FIG. 13A), and an options button 928 at step 930 which will result in the display of a screen presenting the user with different capabilities of cognitive exercise module 110 (FIG. 14A). Further, user is able to click start exercising button 902 at step 932 which will result in one or more cognitive exercises being retrieved and displayed on user device 104.

Figure 10A:
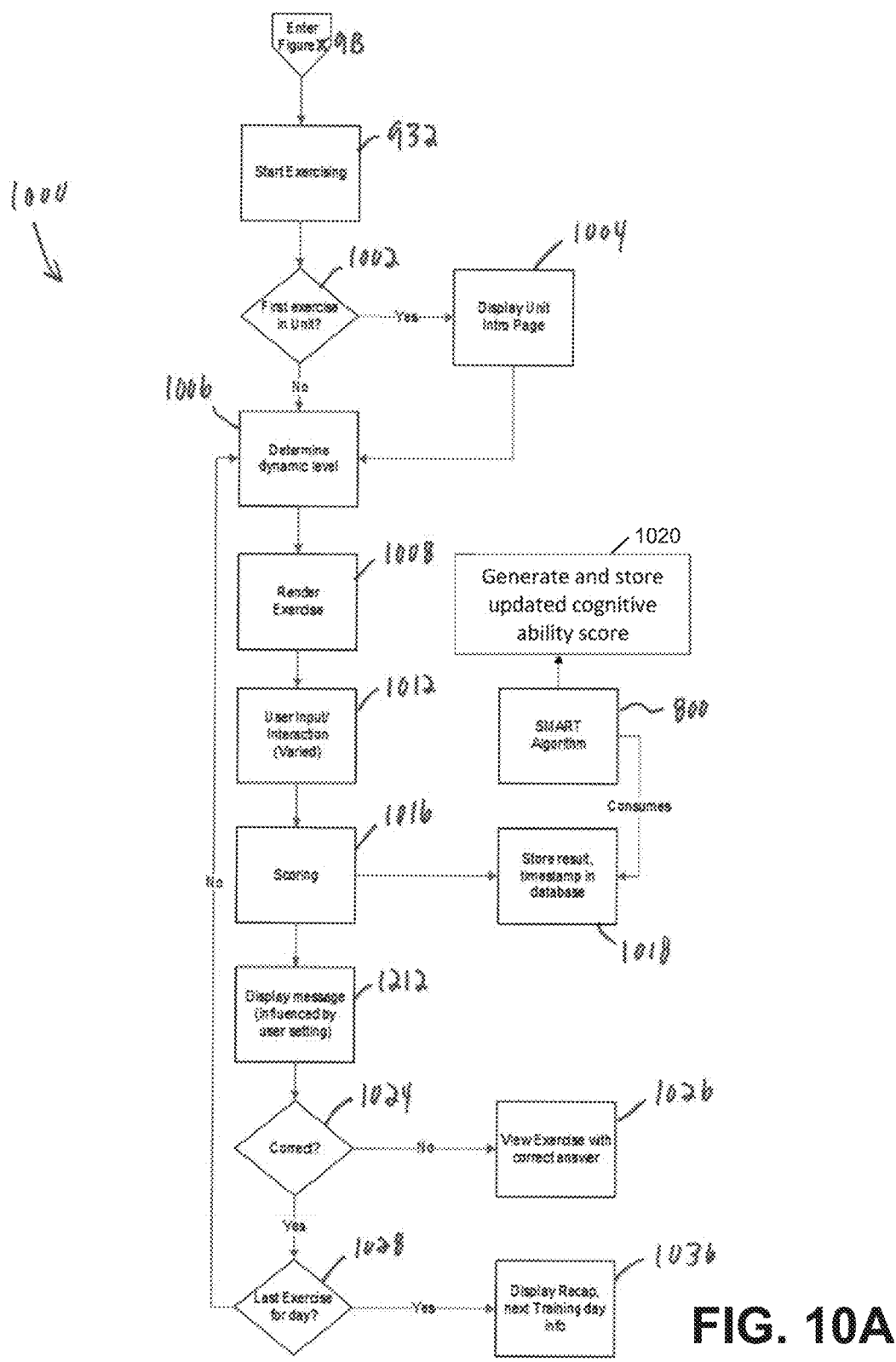
FIG. 10A is a flow chart showing an exemplary work flow for displaying one or more cognitive exercises to a user, and generating and storing an updated cognitive ability score based on the results of the one or more cognitive exercises.
Figure 10B:
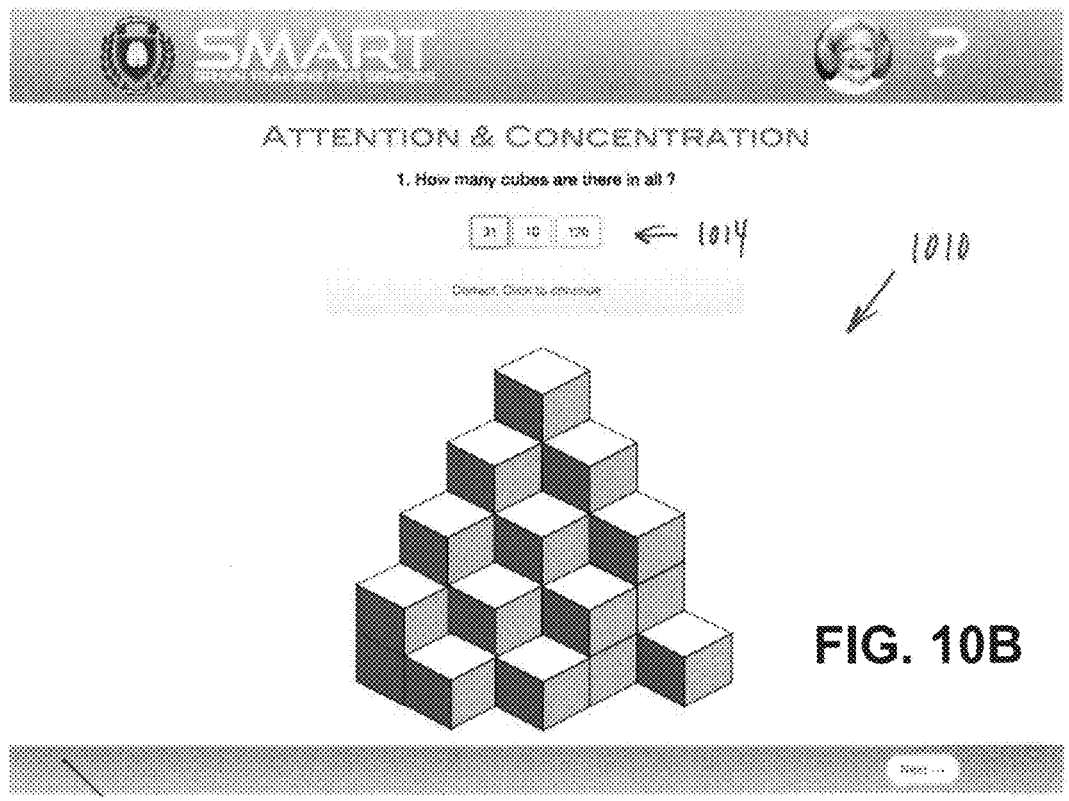
FIG. 10B is a screen shot showing an exemplary cognitive exercise that may be used in conjunction with the present invention.
Figure 10C:
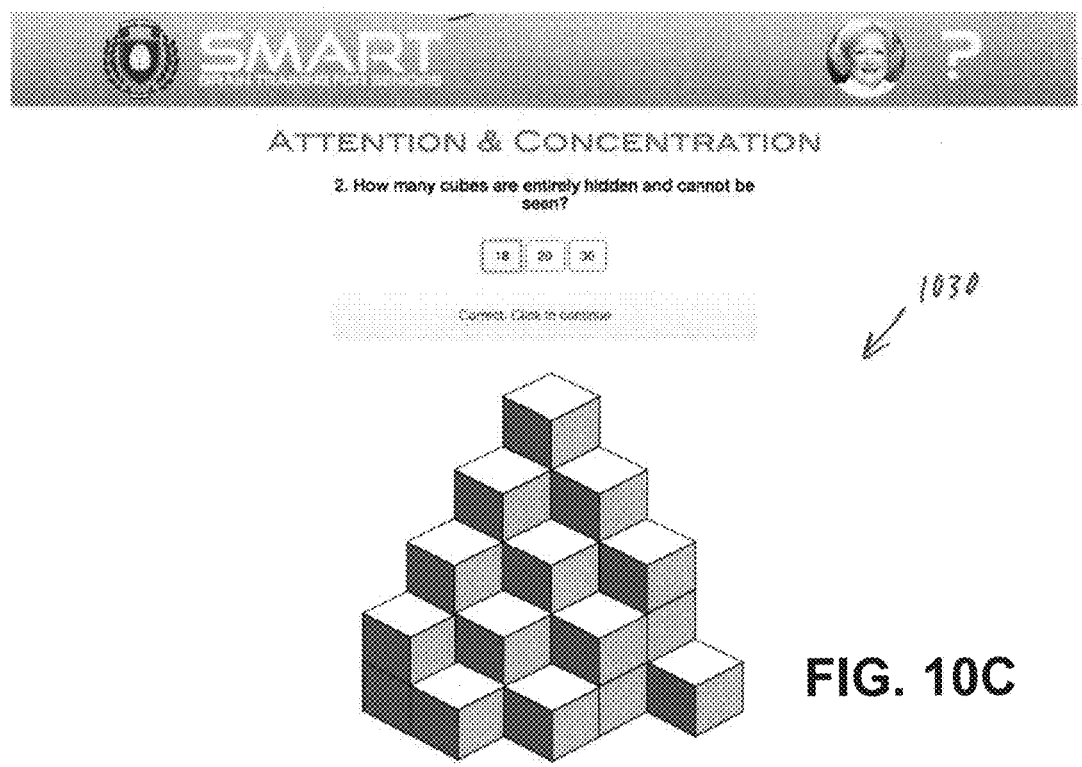
FIG. 10C is a screen shot showing another exemplary cognitive exercise that may be used in conjunction with the present invention.
Figure 10D:
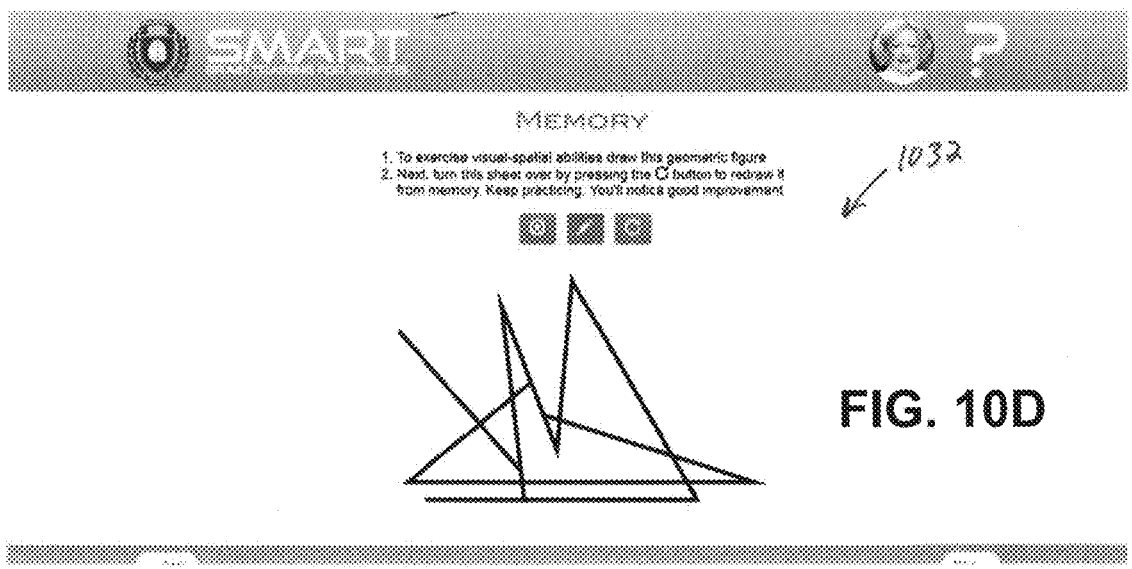
FIG. 10D is a screen shot showing yet another exemplary cognitive exercise that may be used in conjunction with the present invention.
Figure 10E:
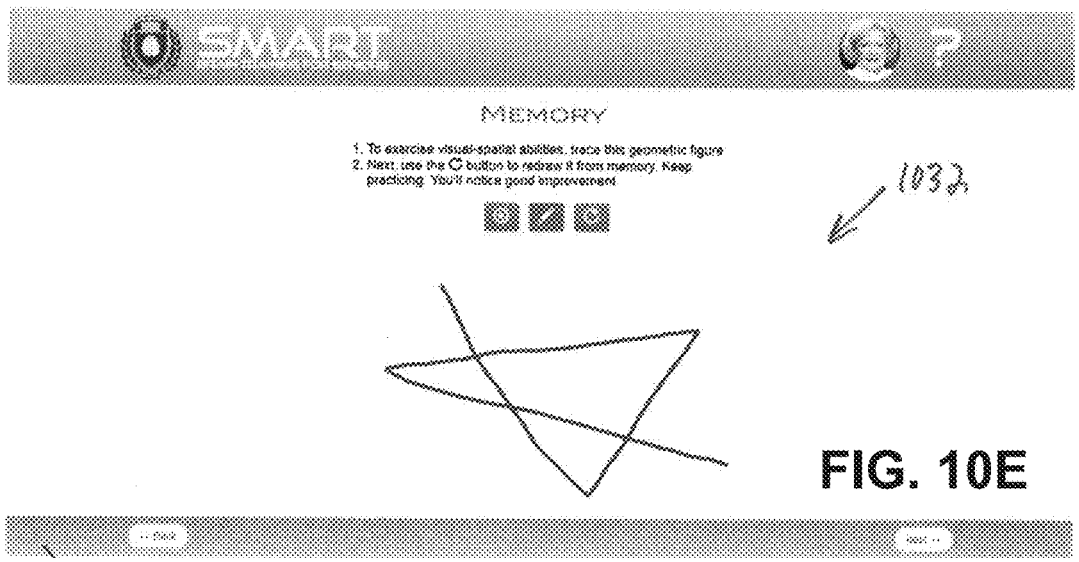
FIG. 10E is a screen shot showing a subsequent progression related to the exemplary cognitive exercise shown in FIG. 10D.

FIG. 10A is a flow chart 1000 showing an exemplary work flow for displaying one or more cognitive exercises to a user, and generating and storing an updated cognitive ability score based on the results of the one or more cognitive exercises. The work flow in FIG. 10 may begin by determining whether this is the first time the user has conducted any cognitive exercises at step 1002. This may be determined by querying user profile database 122. If it is the first time the user is conducting cognitive exercises, an introduction screen may be presented at step 1004 providing the user with general instructions related to the exercises. Next, cognitive exercise module 110 utilizes exercise engine 114 at step 1006 to dynamically determine the cognitive exercises to display on user device 104, based at least in part on initial cognitive ability score generated at step 801 (FIG. 8). Exercise engine 114 may identify any cognitive exercise stored in library 118 and thereafter render and communicate the selected cognitive exercise for display on user device 104 at step 1008. For example, the cognitive exercise 1010 shown in FIG. 10B may be displayed using user device 104 at step 1008. Thereafter, user device 104 is used to allow for user input or interaction at step 1012, by clicking on one or more selections 1014 presented to a user.

Figure 11:
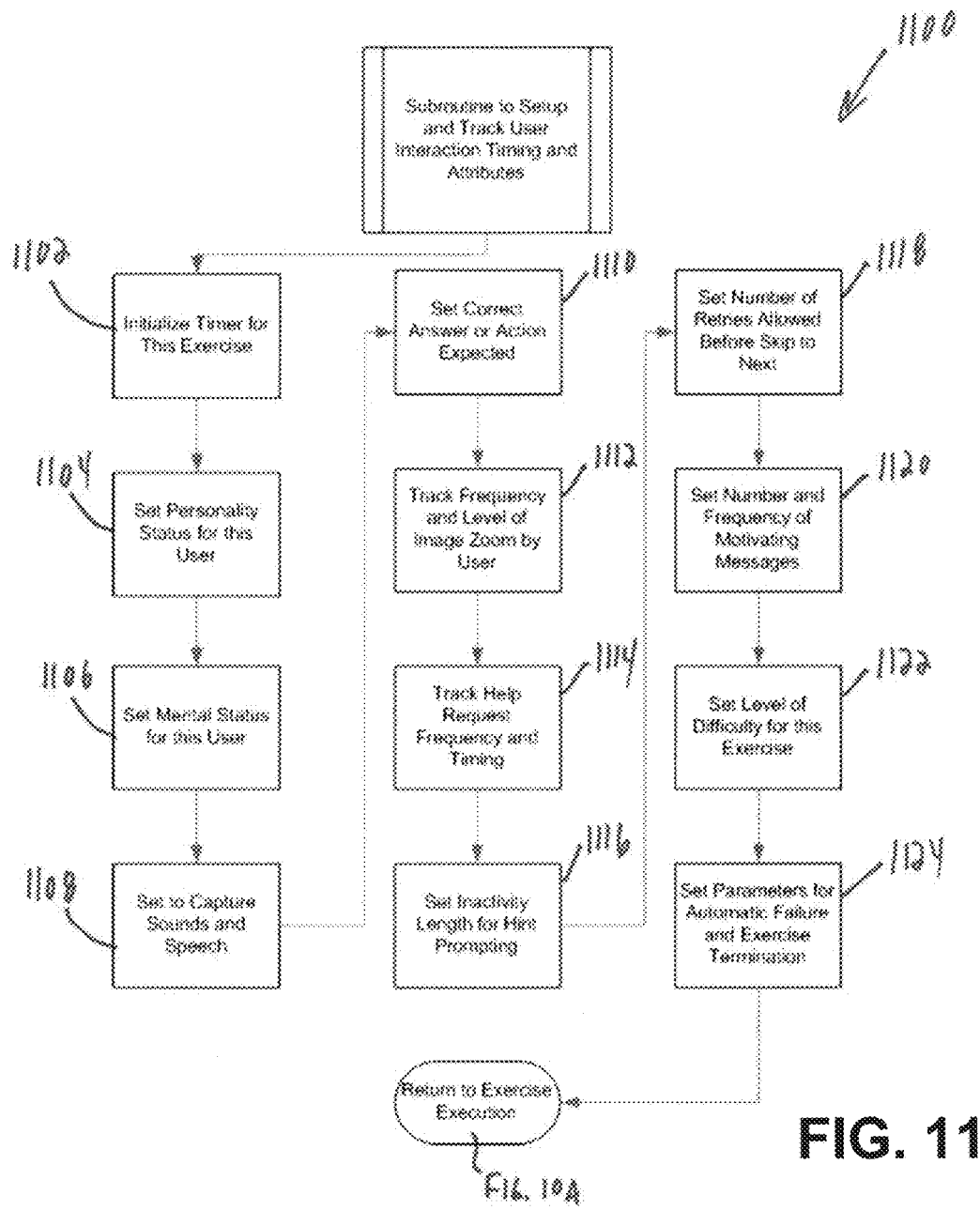
FIG. 11 is a flow chart showing a work flow to setup and track user interaction timing and attributes for a cognitive exercise.

FIG. 11 is a flow chart showing a work flow 1100 to setup and track user interaction timing and attributes for a cognitive exercise at step 1012. In general, this work flow provides timing functions for all activities, set presentation modes based on user personality status, mental state, and mood, capture relevant voices and sound if possible, and monitors the user response in relation to the correct or relevant responses. Module 110 also captures image zoom requests, help requests, and measures response pauses, providing additional help and motivational messages as appropriate. In certain cases, the puzzles will be terminated and scored if user responses are inappropriate. Work flow 1100 begins with an initialization of a timer when a cognitive exercise is started at step 1102, and a personality and mental status is then set for the user at steps 1104, 1106. Module 110 then operates to store sounds and speech received from the user while interacting with the cognitive exercise at step 1108. At step 1110, a correct answer or action expected is set based on the cognitive exercise. The frequency and level of zoom utilized by the user is tracked and stored by module 110 at step 1112, and the frequency and timing of the help requested by the user may also be stored at step 1114. At step 1116, module 110 sets an amount of time that is required to pass with inactivity by the user after which time one or more hints may be provided to the user. Module may also set an amount of retries permitted by the user for a given cognitive exercise before module 110 operates to skip to the next cognitive exercise at step 1118. At step 1120, a frequency and amount of motivation messages (FIG. 10F) to be provided to the user may be set. Further, the level of difficultly for the cognitive exercise may be set by exercise engine 114 at step 1122. Parameters may also be set in that result in automatic failure and termination of the cognitive exercise at step 1124.

Returning now to FIG. 10A, the user input and interaction for the cognitive exercise is then received by cognitive exercise module 110, and then an exercise score is generated at step 1016, which is stored in user profile database 122 in association with the user at step 1018. It should be understood that the exercise score may use the cognitive data collected by exercise API 112, as discussed previously.

Figure 12:
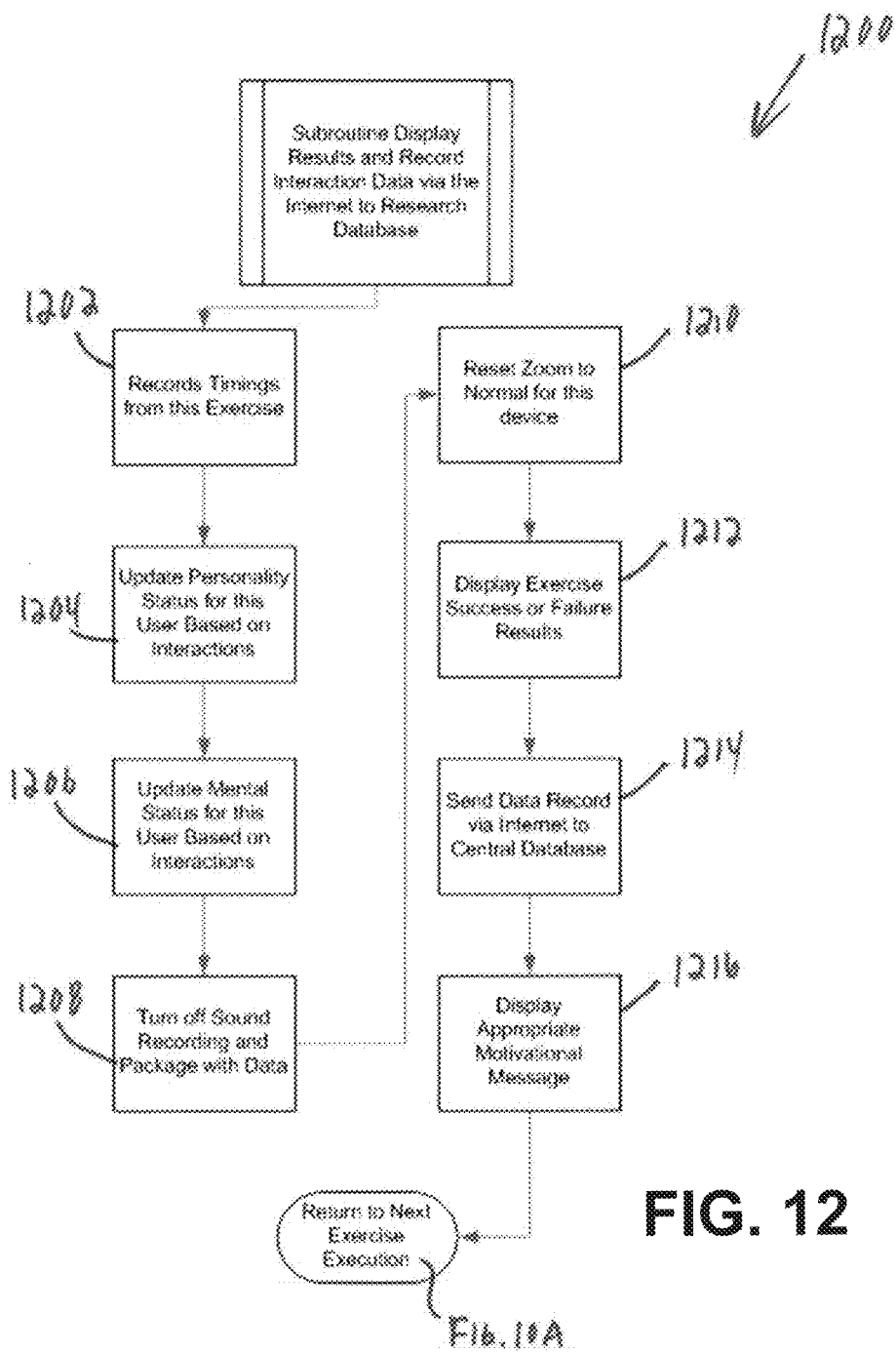
FIG. 12 is a flow chart showing a work flow for displaying the results of a cognitive exercise and recordation of data associated with the interaction of the cognitive exercise by the user.

FIG. 12 is a flow chart showing a work flow 1200 for displaying the results of a cognitive exercise and recordation of data associated with the interaction of the user after each cognitive exercise. However, it should be understood that work flow 1200 could also be used after a group of cognitive exercises have been performed. For example, work flow 1200 may occur in conjunction with the exercise score being calculated in step 1016, or thereafter at step 1018. Work flow 1200 begins at step 1202 with the recordation of the timings of the cognitive exercise in user profile database 122 by exercise API 112, including the amount of time the user spent on the cognitive exercise. The recorded timings may subsequently be used by exercise engine 114 to determine subsequent cognitive exercise for the user. In steps 1204 and 1206, the user personality status and mental status may be updated and stored in user profile database 122 based upon interactions of the user with the cognitive exercise. The recordation of sound is turned off and the recorded data may be packaged, transmitted and stored in user profile database 122 at step 1208. The zoom setting for user device 104 is reset to its default setting step 1210. The success or failure for the particular cognitive exercise may then be displayed to the user at step 1212. At step 1214, all of the aforementioned information and data, such as the relevant cognitive data mentioned above with respect to exercise API 112, is communicated from user device 104 to cognitive exercise module 110 over network 102, whereby the information and data is stored in user profile database 122. At step 1216, a motivation message may then be displayed to the user (FIG. 10F).

Returning now to FIG. 10A, the exercise score generated at step 1016 may then be used by algorithm 800 to generate and store an updated cognitive ability score in user profile database 122 in association with the user, at step 1020. However, it should be understood that when implementing algorithm 800 to generate the updated cognitive ability score, instead of exclusively using initial mental status score 806, the exercise score generated at step 1016 may be used alone; in conjunction with initial mental status score 806; in conjunction with other exercise scores previously generated through the use of module 110 by the user; and any combination thereof. The updated cognitive ability score is thereafter used by exercise engine 114 to select the type and/or quantity of future cognitive exercises using work flow 1000, thereby providing for a dynamic system for adapting to the ability of the user over time, thereby tailoring type and quantity of cognitive exercises to each user of the system and method.

Continuing with the work flow in FIG. 10A, after step 1016, a message may be displayed to the user at step 1212 (see also FIG. 12) indicating whether the interaction at step 1012 was correct (step 1024). If the interaction was not correct, user is presented with the correct answer at step 1026. If the interaction at step 1012 was correct, then the user determines whether to continue with additional cognitive exercises at step 1028. If so, the work flow returns to step 1006 and different cognitive exercises 1030 (FIG. 10C—exercise that requires the user to focus, with a goal of computing a number to answer the questions), 1032 (FIGS. 10D, 10E—testing a user's memory, while facilitating the practice and reiteration required to improve retention and cognitive capability), until the user decides not to do any further cognitive exercises 1034 at step 1036 (FIG. 10F). Each time a new cognitive exercise is completed, a new exercise score is generated and stored in user profile database 122, thereby continually modifying updated cognitive ability score.

It should be understood that the work flow described above with reference to FIG. 10A is also applicable in a situation where there is a match between an entered user login identification and user password with an existing user login identification and user password stored in user profile data base 122 at step 320, as described above with respect to FIG. 3B.

Figure 13A:
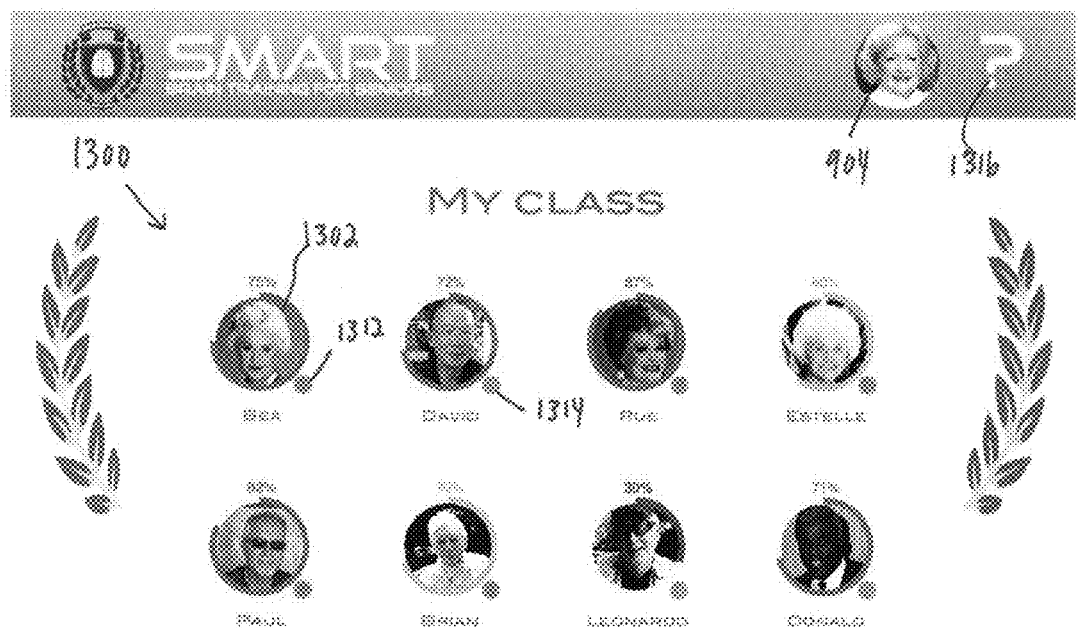
FIG. 13A is a screen shot showing an exemplary user interface showing a user group.
Figure 13B:
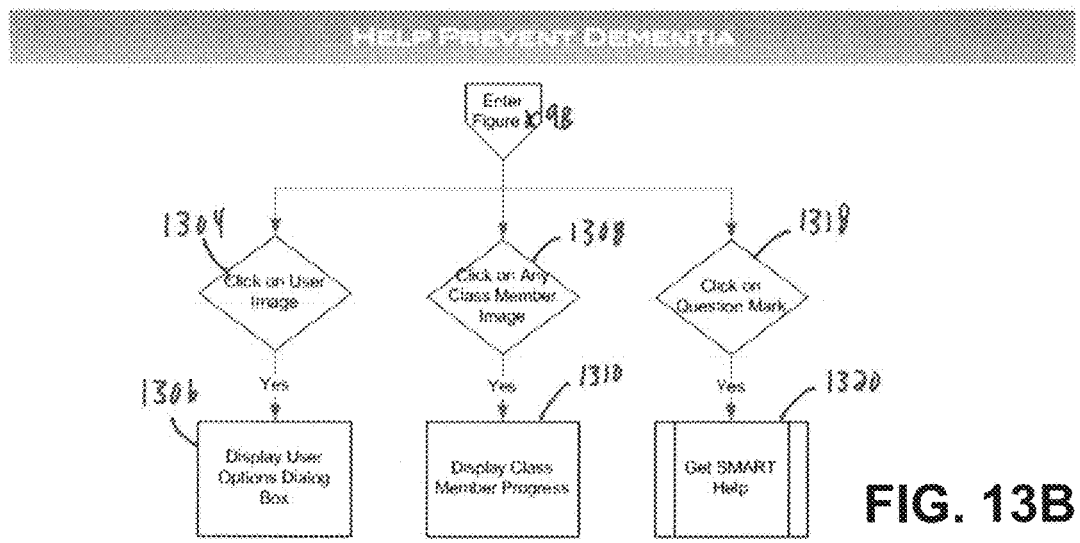
FIG. 13B is a flow chart showing an exemplary work flow that may be used in conjunction with the user interface shown in FIG. 13A.
Figure 14A:
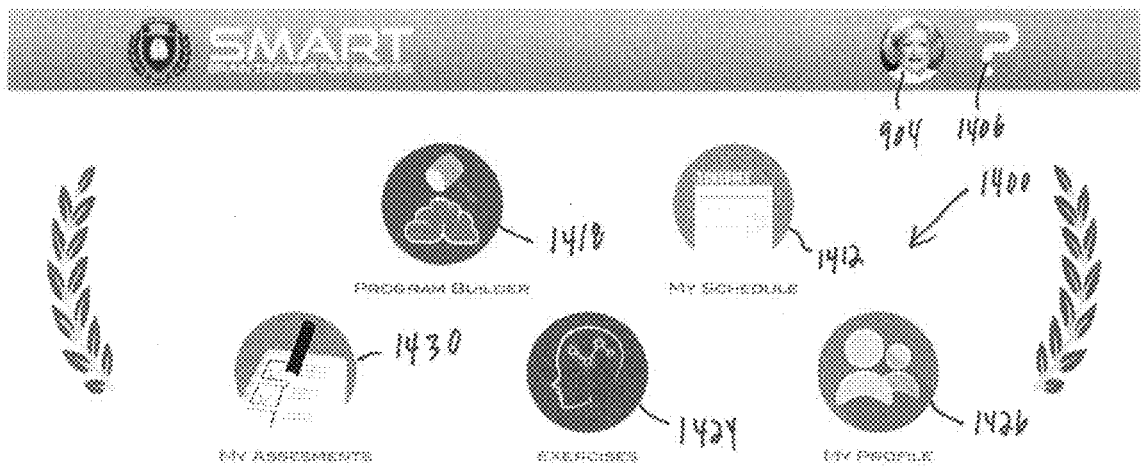
FIG. 14A is a screen shot showing an exemplary options menu that may be used in conjunction with the present invention.
Figure 14B:
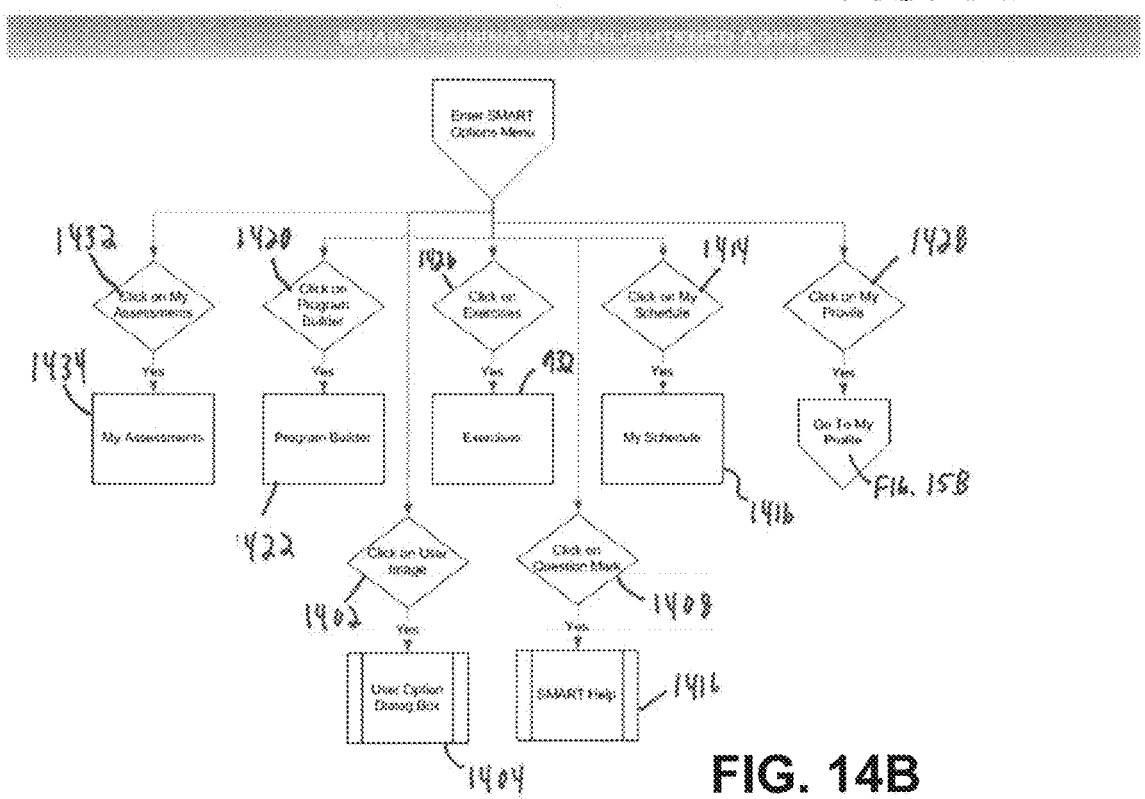
FIG. 14B is a flow chart showing an exemplary work flow that may be used in conjunction with the options menu shown in FIG. 14A.
Figure 14C:
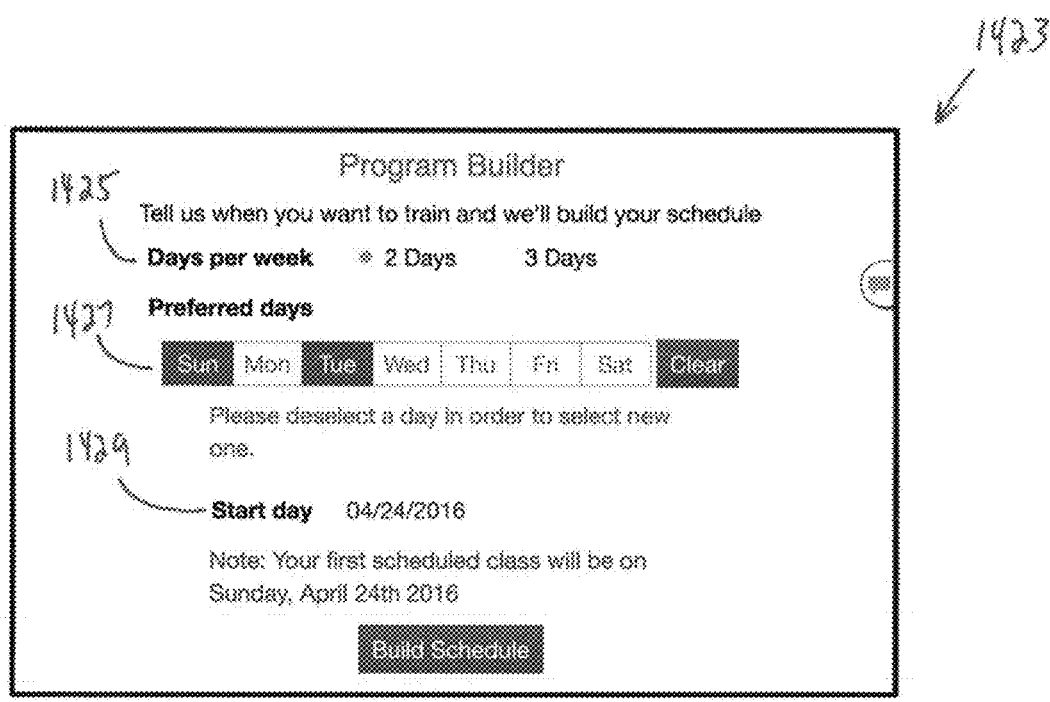
FIG. 14c is a screen shot showing an exemplary program builder feature that may be used in conjunction with the present invention.
Figure 15A:
FIG. 15A is a screen shot showing an exemplary profile interface that may be used in conjunction with the present invention.
Figure 15B:
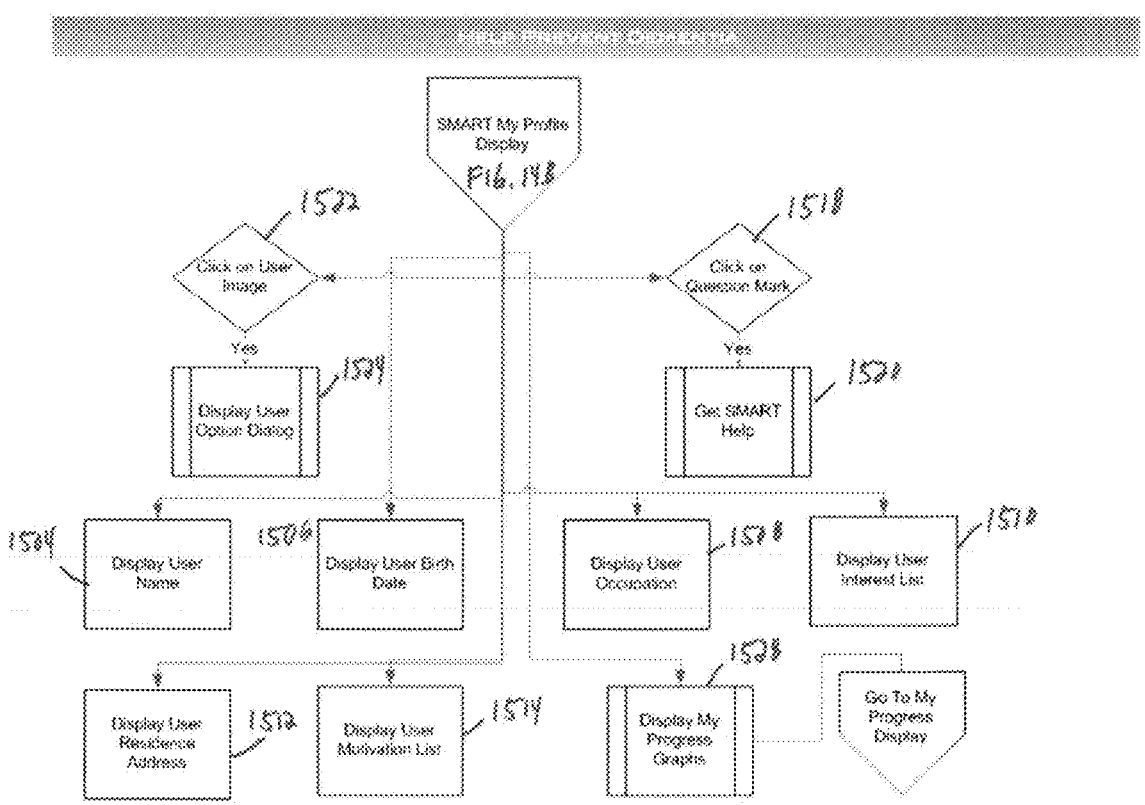
FIG. 15B is a flow chart showing an exemplary work flow that may be used in conjunction with the profile interface shown in FIG. 15A.

As best seen in FIG. 13A, a screen shot 1300 is displayed on user device 104 as a result of my class button 924 being selected by a user at step 926 (FIG. 9A). Screen shot 1300 displays one or more digital images 1302 of other users that have associated with user to form a group. With additional reference to FIG. 13B, user has the option to click on the user image button 904 at step 1304, which results in the display of user options dialog box 906 at step 1306, as was previously described above with reference FIGS. 9A and 9B. Further, any of the digital images 1302 associated with the other users may be selected at step 1308, which will result in the display of the progress of the other user that is selected at step 1310. The progress displayed can be in relation to the user on brain exercises that have been taken. The class concept is relevant from both a social media standpoint, but also from a motivational standpoint. Class member milestones may be communicated by module 110 through a data feed on the class page, but also by sending random emails to group members. The green circle 1312 adjacent to the digital image indicates that a user is online, whereas a grey circle 1314 indicates the user is offline. The question mark button 1316 may also be selected at step 1318, which will result in module 110 providing user with the requested information at step 1320.

As best seen in FIG. 14A, a screen shot 1400 is displayed on user device 104 as a result of options button 928 being selected by a user at step 930 (FIG. 9A). Screen shot 1400 displays a plurality of buttons that provide additional paths to activities to the user. For example, as described above with respect to FIGS. 9A and 9B, screen shot 1400 may display user image button 904 at step 1402, which results in the display of user options dialog box 906 at step 1404. Further, a question mark button 1406 may also be selected at step 1408, which will result in module 110 providing user with the requested information at step 1410. In addition, a my schedule button 1412 may be selected at step 1414, which provides an additional interface 1416 for the user to view, plan, and select cognitive exercises to be performed in the future. A program builder button 1418 may be selected at step 1420, which allows the user to customize the cognitive exercises that will be performed in a specified session, at step 1422. For example, with reference to the screen shot in FIG. 14C, the user may be provided the option to select the number of days 1425 to use cognitive exercise module 110 (e.g., 2 or 3 days per week), the preferred days of use 1427, and a start date 1429. In addition, the user may be provided the option to select a focus for a particular session by specifying one or more exercise categories (e.g., Attention & Concentration, Memory, Speech & Language, Speed of Processing, Mood and Psychological Issues). Referring back to FIG. 14B, an exercises button 1424 may be selected at step 1426, which moves the work flow to step 932 (FIG. 10A), as previously described.

Screen shot 1400 also illustrates the display of a profile button 1426 that may be selected by a user at step 1428. Upon selection of my profile button 1426, a screen shot 1500 may be displayed as set forth in FIG. 15A. Screen shot 1500 provides for the display of one or more of the personalization parameters 1502 inputted and stored within the screen shots 400, 500 and work flows set forth in FIG. 4A through FIG. 5B. The one or more personalization parameters 1502 that may be displayed, for example, are user name, birth date, user occupation, interest list, residence address, and motivation list as set forth in steps 1504-1514 in FIG. 15B. The work flow may also allow the user to select a question button 1516 at step 1518 to obtain requested information at step 1520, and select an image button 904 at step 1522 to display user option box 916 (FIG. 9A) at step 1524, as previously discussed. Screen shot 1400 alsoillustrates one or more progress graphs 1526 displaying the progress the user has made on all recent performance activities during cognitive exercise solution efforts, at step 1528. These graphs may include details on different exercise categories, such as, but not limited to, attention and concentration, memory, speech and language, speed of processing, and mood or psychological profile.

Figure 16A:
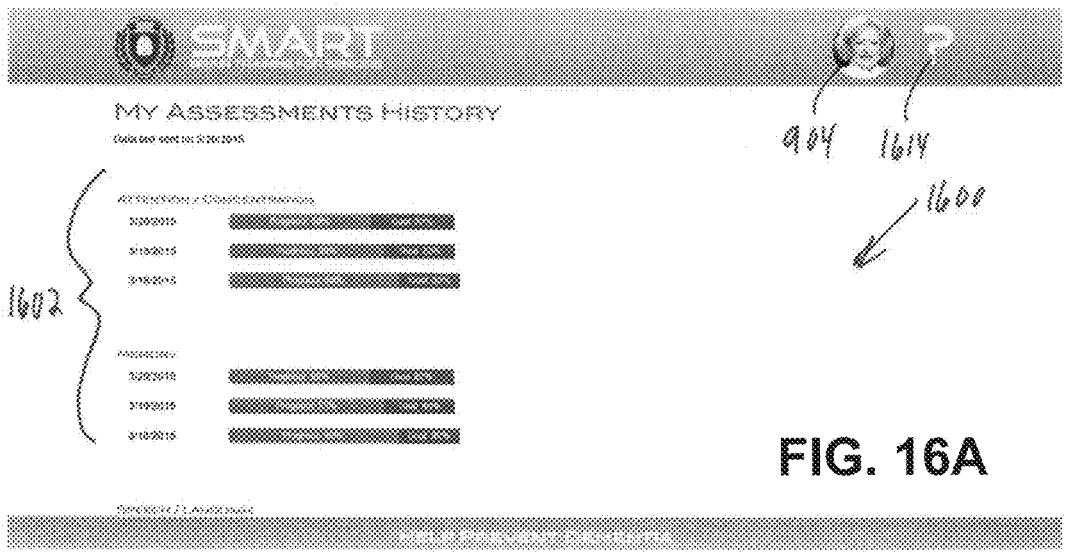
FIG. 16A is a screen shot showing an exemplary assessment history that may be used in conjunction with the present invention.
Figure 16B:
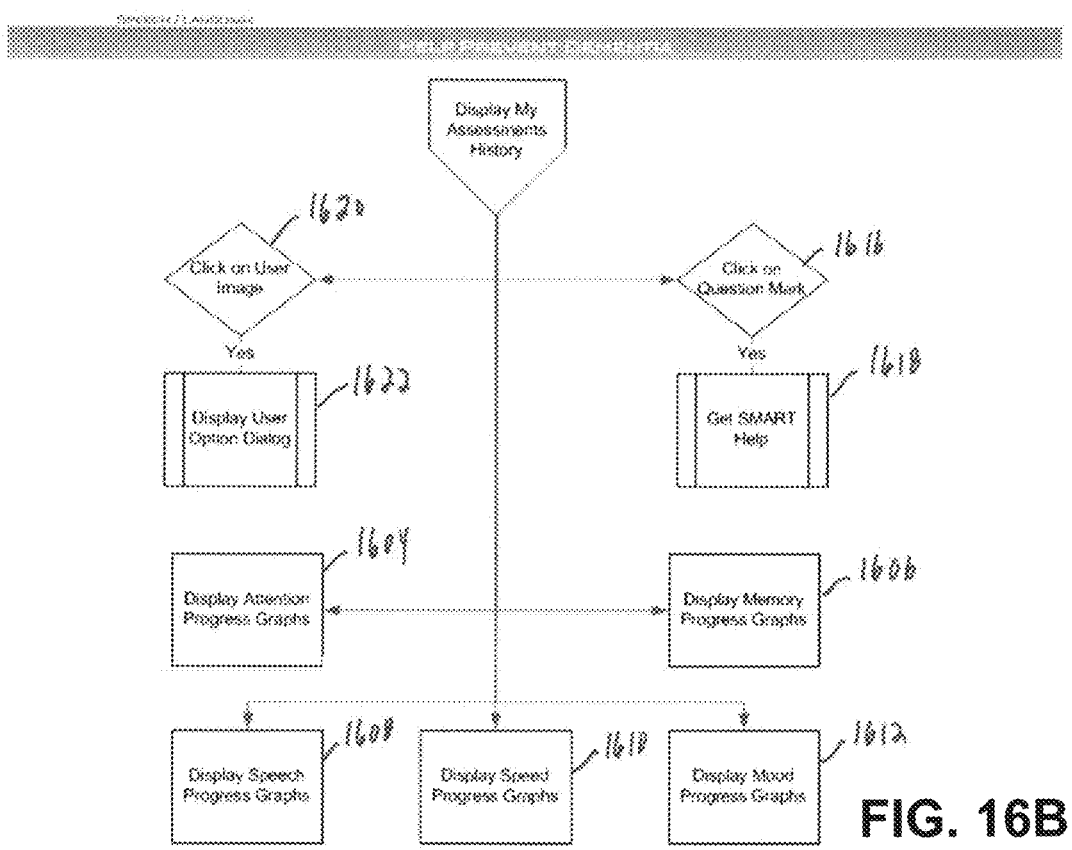
FIG. 16B is a flow chart showing an exemplary work flow that may be used in conjunction with the assessment history interface shown in FIG. 16A.

Referring back to FIG. 14A, screen shot 1400 further illustrates a my assessments button 1430 that may be selected by a user at step 1432, which in turn results in the display of a user assessments history 1600 at step 1434. With reference to FIG. 16A, screen shot 1600 displays a user's assessment history, including graphs 1602 on all recent performance activities during cognitive exercise solution efforts. This may include displaying details on the progress in the areas of attention and concentration at step 1604, memory at step 1606, speech and language at step 1608, speed of processing at step 1610, and mood or psychological profile at step 1612. The historical data arranged by date may also be provided to show the user his or her cognitive progress over time. The work flow may also allow user to select a question button 1614 at step 1616 to obtain requested information at step 1618, and select an image button 904 at step 1620 to display user option box 916 (FIG. 9A) at step 1622, as previously discussed.

Having described the system and method of the present invention and an embodiment thereof, an exemplary computer environment for implementing the described design and execution is presented next.

Figure 17:
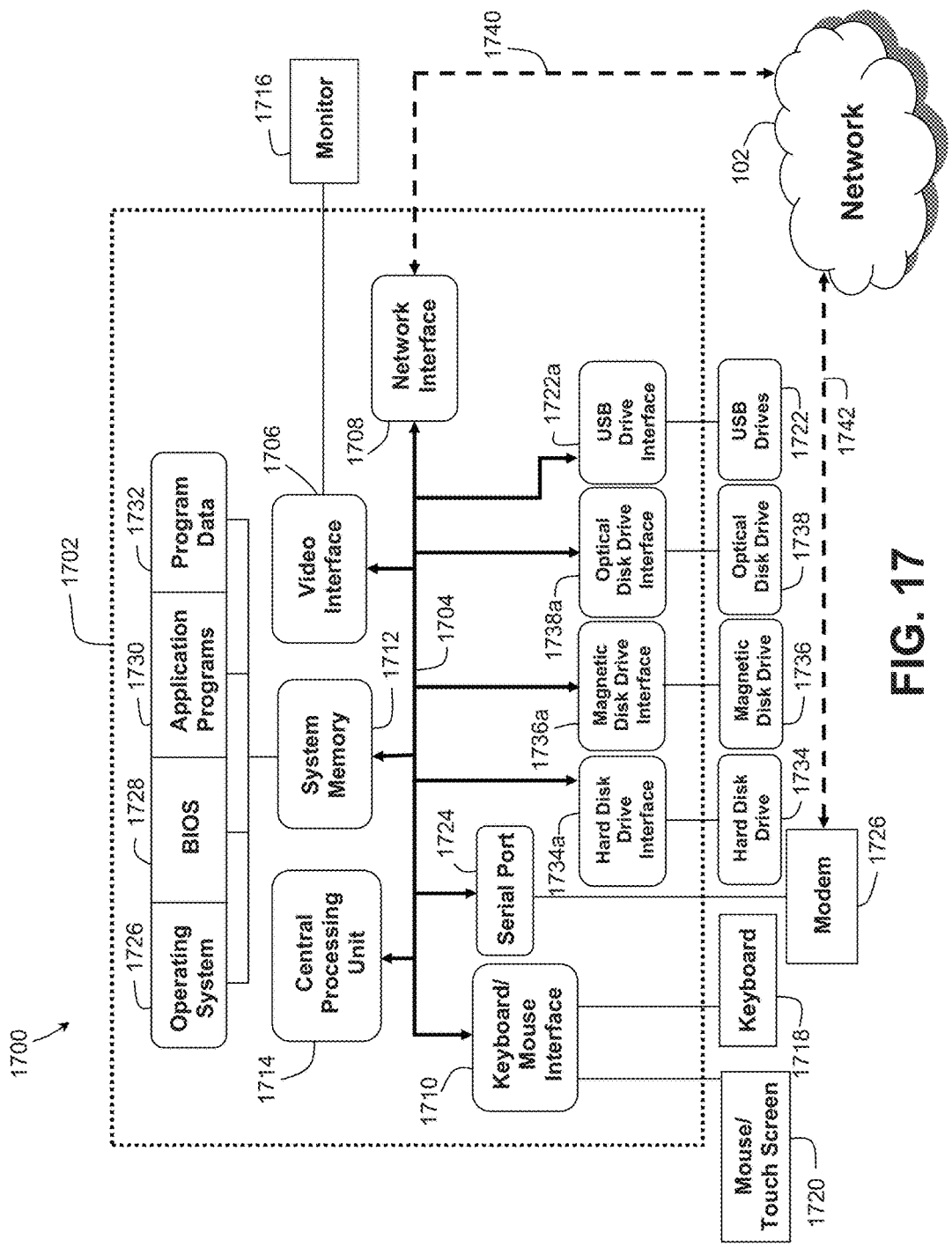
FIG. 17 a schematic diagram generally illustrating a computing environment in which the invention may be implemented.

FIG. 17 shows an exemplary computing environment 1700 that can be used to implement any of the methods and processing thus far described. Computing environment 1700 may include one or more computers 1702 (such as, for example, user device 104, server 106, third party computing device 120) comprising a system bus 1704 that couples a video interface 1706, network interface 1708, a keyboard/mouse interface 1710, and a system memory 1712 to a Central Processing Unit (CPU) 1714. It should be understood that system memory 1712 may represent memory 108 in the case of server 106, or system memory 1712 could be a separate data store. A monitor or display 1716 is connected to bus 1704 by video interface 1706 and may provide the respective user with a graphical user interface to interact with cognitive exercise module 110. The graphical user interface allows the user to enter commands and information into computer 1702 using a keyboard 1718 and a user interface selection device 1720, such as a mouse or other pointing device. Keyboard 1718 and user interface selection device are connected to bus 1704 through keyboard/mouse interface 1710. The display 1716 and user interface selection device 1720 are used in combination to form the graphical user interface which allows the user to implement at least a portion of the present invention. Other peripheral devices may be connected to the remote computer through universal serial bus (USB) drives 1722 to transfer information to and from computer 1702. For example, microphones, cameras and camcorders may be connected to computer 1702 through serial port 1724 or USB drives 1722 so that data related to generating the user profile and interacting with the cognitive exercises in the cognitive exercise module 110 may be downloaded to system memory 1712 or another memory storage device associated to implement certain aspects of system 100.

The system memory 1712 is also connected to bus 1704 and may include read only memory (ROM), random access memory (RAM), an operating system 1726, a basic input/output system (BIOS) 1728, application programs 1730 (such as cognitive exercise module 110) and program data 1732. The computer 1702 may further include a hard disk drive 1734 for reading from and writing to a hard disk, a magnetic disk drive 1736 for reading from and writing to a removable magnetic disk (e.g., floppy disk), and an optical disk drive 1738 for reading from and writing to a removable optical disk (e.g., CD ROM or other optical media). The computer 1702 may also include USB drives 1722 and other types of drives for reading from and writing to flash memory devices (e.g., compact flash, memory stick/PRO and DUO, SD card, multimedia card, smart media xD card). A hard disk drive interface 1734a, magnetic disk drive interface 1736a, an optical drive interface 1738a, and a USB drive interface 1722a operate to connect bus 1704 to hard disk drive 1734, magnetic disk drive 1736, optical disk drive 1738, and USB drive 1722, respectively. Each of these drive components and their associated computer-readable media may provide computer 1702 with non-volatile storage of computer-readable instruction, program modules, data structures, application programs, an operating system, and other data for computer 1702. In addition, it will be understood that computer 1702 may also utilize other types of computer-readable media in addition to those types set forth herein, such as digital video disks, random access memory, read only memory, other types of flash memory cards, magnetic cassettes, and the like.

Computer 1702 may operate in a networked environment using logical connections other computers, as described herein. Network interface 1708 provides a communication path 1740 between bus 1704 and network 102, which allows, for example, server 106 (cognitive exercise module 110) to transmit cognitive exercises and other information to be communicated through network 102 to user device 104, or for user device 104 to communicate the information required for cognitive exercise module 110 to operate in accordance with the present invention. The aforementioned information and data may also be communicated to and from bus 1704 through a communication path 1742 to network 102 using serial port 1724 and a modem 1726. Using a modem connection between the computer 1702 and server 106 may be used in conjunction with a wide area network (WAN), such as the Internet. It will be appreciated that the network connections shown herein are merely exemplary, and it is within the scope of the present invention to use other types of network connections between server 106, user device 104, and third party computing device 120 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer-implemented method for rehabilitating a cognitive ability of a user with early-stage dementia, wherein a processor is programmed for executing the method comprising:
   receiving at least one personalization parameter from a user computing device provided by the user;
   allowing for at least one cognitive ability exercise to be displayed on a display of the user computing device;
   allowing the user to interact with the at least one cognitive ability exercise using the user computing device;
   receiving cognitive data from the user computing device based on the interaction of the at least one cognitive ability exercise by the user;
   generating a first mental status score based at least in part on the received cognitive data;
   applying weighting factors to the generated first mental status score and said at least one personalization parameter;
   utilizing the applied weighting factors of the first mental status score and the at least one personalization parameter to generate a first cognitive ability score;
   generating at least one rehabilitating cognitive ability exercise based at least in part on said first cognitive ability score;
   allowing for the display of said at least one rehabilitating cognitive ability exercise on the display of the user computing device; and
   allowing the user to interact with said at least one rehabilitating cognitive ability exercise using the user computing device,
   wherein said interaction with said at least one rehabilitating cognitive ability exercise by the user rehabilitates the cognitive ability of the user.

2. A computer-implemented method in accordance with claim 1, wherein the at least one personalization parameter is one or more of background information of the user and personality traits of the user.

3. A computer-implemented method in accordance with claim 2, wherein the background information of the user includes one or more of the user's date of birth, gender, marital status, city of residence, highest education completed, work status, occupation, interests, and motivation.

4. A computer-implemented method in accordance with claim 2, wherein the personality traits of a user includes one or more of need for affection, warmth, and conscientiousness.

5. A computer-implemented method in accordance with claim 1, wherein the cognitive data includes one or more of an amount of time user spends interacting with the at least one cognitive ability exercise, a determination of whether the interaction with the at least one cognitive ability exercise was a success or failure, and a level of difficulty of the at least one cognitive ability exercise.

6. A computer-implemented method in accordance with claim 5, further comprising the steps of receiving sounds and speech of the user from the user computing device during the interaction of the at least one cognitive ability exercise by the user, and recording the received sounds and speech, wherein the cognitive data includes the recorded sounds and speech.

7. A computer-implemented method in accordance with claim 1, wherein the step of allowing the user to interact with the at least one cognitive ability exercise includes the step of allowing for the selection of an answer from two or more possible answers related to the said at least one cognitive ability exercise using the user computing device.

8. A computer-implemented method in accordance with claim 1, further comprising the step of displaying the first mental status score to the user on the display of the user computing device.

9. A computer-implemented method in accordance with claim 1, wherein the user is a first user, and further comprising the step of comparing the first cognitive ability score of the first user with a first cognitive ability score of a second user.

10. A computer-implemented method in accordance with claim 9, wherein the first user and the second user are associated in a group.

11. A computer-implemented method in accordance with claim 1, wherein a difficultly level is adjusted for the rehabilitating cognitive ability exercise based on the first cognitive ability score.

12. A computer-implemented method in accordance with claim 1, further comprising the step of providing motivation to the user during the interaction with the at least one cognitive ability exercise.

13. A computer-implemented method in accordance with claim 1, wherein the interaction with the at least one cognitive ability exercise does not require a physical activity.

14. A computer-implemented method in accordance with claim 13, wherein the physical activity includes using a keyboard.

15. A computer-implemented method in accordance with claim 1 including the further steps of:
   generating a second cognitive ability score based at least in part on the user's interaction with said rehabilitating cognitive ability exercise;
   determining at least one further rehabilitating cognitive ability exercise based upon said second cognitive ability score;
   allowing for the display of said further rehabilitating cognitive ability exercise on the display of the user computing device; and
   allowing the user to interact with said further rehabilitating cognitive ability exercise using the user computing device,
   wherein said interaction with said further rehabilitating cognitive ability exercise by the user further rehabilitates the cognitive ability of the user.

16. A computer-implemented method in accordance with claim 15 wherein said second mental status score is also derived from said first mental status score.

17. A system for rehabilitating a cognitive ability of a user with early-stage dementia, wherein the user interacts with the system using a user computing device over a network, the system comprising:
- a central computing device in communication with the network, wherein the computing device includes a memory, and wherein at least one personalization parameter and computer-executable instructions representative of at least one cognitive ability exercise are stored in the memory;
- a cognitive ability exercise module stored in the memory, wherein the cognitive ability exercise module includes an exercise application programming interface (API) and an exercise engine;
- wherein the exercise engine operates to display a first cognitive ability exercise on a display of a user computing device;
- wherein the exercise API operates to collect cognitive data from the user computing device based on an interaction of the first cognitive ability exercise by the user;
- wherein a first mental status score is generated based at least in part on the received cognitive data;
- wherein weighting factors are applied to the generated first mental status score and said at least one personalization parameter;
- wherein the applied weighting factors of the first mental status score and the at least one personalization parameter are utilized to generate a first cognitive ability score;
- wherein the generated first cognitive ability score is utilized in generating a rehabilitating cognitive ability exercise to be displayed to the user on the display of the user computing device; and
- wherein the rehabilitating cognitive ability exercise is interacted with by the user using the user computing device for rehabilitating the cognitive ability of the user.

18. A system in accordance with claim 17, wherein the cognitive ability exercise module further includes an exercise registration module, wherein the exercise registration module operates to register the first cognitive ability exercise in an exercise library.

19. A system in accordance with claim 17, further comprising a user profile database, wherein the first mental status score is associated with the user in the user profile database.

20. A system in accordance with claim 17, wherein the central computing device is a server.

21. A system in accordance with claim 17, wherein the at least one personalization parameter is one or more of background information of the user and personality traits of the user.

22. A method in accordance with claim 21, wherein the background information of the user includes one or more of the user's date of birth, gender, marital status, city of residence, highest education completed, work status, occupation, interests, and motivation.

23. A method in accordance with claim 21, wherein the personality traits of a user includes one or more of need for affection, warmth, and conscientiousness.

24. A method in accordance with claim 17, wherein the cognitive data includes one or more of an amount of time user spends interacting with the at least one cognitive ability exercise, a determination of whether the interaction with the at least one cognitive ability exercise was a success or failure, and a level of difficulty of the at least one cognitive ability exercise.

25. A non-transitory computer readable medium having thereon computer executable instructions for performing a computer-implemented method for rehabilitating a cognitive ability of a user with early-stage dementia, wherein a processor is programmed for executing the method comprising:
- receiving at least one personalization parameter from a user computing device provided by the user;
- allowing at least one cognitive ability exercise to be displayed on a display of the user computing device;
- allowing the user to interact with the at least one cognitive ability exercise using the user computing device;
- receiving cognitive data from the user computing device based on the interaction of the at least one cognitive ability exercise by the user;
- generating a first mental status score based at least in part on the received cognitive data;
- applying weighting factors to the generated first mental status score and said at least one personalization parameter;
- utilizing the applied weighting factors of the first mental status score and the at least one personalization parameter to generate a first cognitive ability score;
- generating at least one rehabilitating cognitive ability exercise based at least in part on said first cognitive ability score;
- allowing for the display of said at least one rehabilitating cognitive ability exercise on the display of the user computing device; and
- allowing the user to interact with said at least one rehabilitating cognitive ability exercise using the user computing device,
- wherein said interaction with said at least one rehabilitating cognitive ability exercise by the user rehabilitates the cognitive ability of the user.

* * * * *